United States Patent
Nagaraja et al.

(10) Patent No.: US 12,049,230 B2
(45) Date of Patent: *Jul. 30, 2024

(54) METHOD AND APPARATUS FOR DETERMINING INFORMATION RELATED TO A LANE CHANGE OF TARGET VEHICLE, METHOD AND APPARATUS FOR DETERMINING A VEHICLE COMFORT METRIC FOR A PREDICTION OF A DRIVING MANEUVER OF A TARGET VEHICLE AND COMPUTER PROGRAM

(71) Applicant: Bayerische Motoren Werke Aktiengesellschaft, Munich (DE)

(72) Inventors: Naveen Shankar Nagaraja, Munich (DE); Oliver Scheel, Munich (DE); Loren Schwarz, Gruenwald (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 8 days.

This patent is subject to a terminal disclaimer.

(21) Appl. No.: 17/054,650

(22) PCT Filed: May 28, 2019

(86) PCT No.: PCT/EP2019/063826
§ 371 (c)(1),
(2) Date: Nov. 11, 2020

(87) PCT Pub. No.: WO2020/094264
PCT Pub. Date: May 14, 2020

(65) Prior Publication Data
US 2021/0114604 A1  Apr. 22, 2021

(30) Foreign Application Priority Data
Nov. 8, 2018 (EP) .................... 18205225

(51) Int. Cl.
*B60W 50/00* (2006.01)
*G06N 3/044* (2023.01)

(52) U.S. Cl.
CPC .... *B60W 50/0098* (2013.01); *B60W 50/0097* (2013.01); *G06N 3/044* (2023.01); *B60W 2050/0018* (2013.01)

(58) Field of Classification Search
CPC ......... B60W 50/0097; B60W 50/0098; B60W 2050/0018; G06N 3/0445; G06N 3/0454; G06N 3/0463
See application file for complete search history.

(56) References Cited

U.S. PATENT DOCUMENTS 9,760,806 B1  9/2017 Ning et al.
2013/0054106 A1  2/2013 Schmüdderich et al.
(Continued)

FOREIGN PATENT DOCUMENTS

CN  107909151 A  4/2018
CN  108352112 A  7/2018
(Continued)

OTHER PUBLICATIONS

"Recent developments and research needs in modeling lane changing", Zheng, Zuduo, Transportation Research Part B 60 (2014) 16-32 (Year: 2014).*
(Continued)

*Primary Examiner* — Amelia Vorce
(74) *Attorney, Agent, or Firm* — Crowell & Moring LLP

(57) ABSTRACT

A method for determining information related to a lane change of a target vehicle includes obtaining information related to an environment of the target vehicle. The information related to the environment relates to a plurality of features of the environment of the target vehicle. The plurality of features are partitioned into two or more groups
(Continued)

of features. The method further determines two or more weighting factors for the two or more groups of features. An attention mechanism is used for determining the two or more weighting factors. The method further determines the information related to the lane change of the target vehicle based on the information related to the environment of the target vehicle using a machine-learning network. A weighting of the plurality of features of the environment of the target vehicle within the machine-learning network is based on the two or more weighting factors for the two or more groups of features.

11 Claims, 21 Drawing Sheets

(56) References Cited

U.S. PATENT DOCUMENTS

| | | | |
|---|---|---|---|
| 2015/0203109 | A1 | 7/2015 | McClain et al. |
| 2016/0325743 | A1* | 11/2016 | Schmüdderich .. B60W 50/0097 |
| 2018/0032082 | A1 | 2/2018 | Shalev-Shwartz et al. |
| 2018/0053108 | A1* | 2/2018 | Olabiyi ................. G06N 7/005 |
| 2018/0105186 | A1* | 4/2018 | Motomura ............. G06V 10/82 |
| 2018/0186371 | A1 | 7/2018 | Sterniak |
| 2018/0194286 | A1 | 7/2018 | Stein |
| 2018/0374359 | A1 | 12/2018 | Li et al. |
| 2019/0005387 | A1 | 1/2019 | Blayvas et al. |
| 2019/0025841 | A1* | 1/2019 | Haynes ................ G05D 1/0214 |
| 2019/0072965 | A1* | 3/2019 | Zhang .................... G08G 1/161 |
| 2019/0129436 | A1* | 5/2019 | Sun .......................... G06N 3/08 |
| 2019/0266516 | A1 | 8/2019 | Olabiyi |
| 2019/0375420 | A1* | 12/2019 | Hou .................. B60W 50/0097 |
| 2020/0055515 | A1* | 2/2020 | Herman ................. G06V 20/56 |
| 2020/0065711 | A1 | 2/2020 | Clément et al. |
| 2020/0139973 | A1* | 5/2020 | Palanisamy ............ G08G 1/167 |
| 2020/0139975 | A1* | 5/2020 | Ishikawa .................. G06N 3/08 |
| 2021/0081754 | A1* | 3/2021 | Frolova ................... G06N 3/04 |
| 2021/0272020 | A1* | 9/2021 | Narihira .................... G08G 1/01 |
| 2021/0312725 | A1* | 10/2021 | Milton .................... G07C 5/008 |
| 2023/0186083 | A1* | 6/2023 | Silberman .............. G06N 3/044 706/12 |

FOREIGN PATENT DOCUMENTS

| | | |
|---|---|---|
| CN | 108431549 A | 8/2018 |
| DE | 10 2005 043 838 A1 | 3/2007 |
| EP | 2 562 060 A1 | 2/2013 |
| WO | WO 2018/118112 A1 | 6/2018 |
| WO | WO 2018/184204 A1 | 10/2018 |

OTHER PUBLICATIONS

"The effects of lane-changing on the immediate follower: Anticipation, relaxation, and change in driver characteristics", Zheng, Zuduo, Transportation Research Part C 26 (2013) 367-379 (Year: 2013).*
"Personalized Driver/Vehicle Lane Change Models for ADAS", Butakov, Vadim, IEEE Transactions on Vehicular Technology, vol. 64, No. 10, Oct. 2015 (Year: 2015).*
Kim et al., "Prediction of Driver's Intention of Lane Change by Augmenting Sensor Information Using Machine Learning Techniques", Sensors 2017, 17, 1350; doi:10.3390/s17061350 (Year: 2017).*
International Search Report (PCT/ISA/210) issued in PCT Application No. PCT/EP2019/063826 dated Nov. 25, 2019 with English translation (four (4) pages).
Written Opinion (PCT/ISA/237) issued in PCT Application No. PCT/EP2019/063826 dated Nov. 25, 2019 (eight (8) pages).
Extended European Search Report issued in European Application No. 18205225.8 dated Jun. 19, 2019 (12 pages).
Schlechtriemen, J. et al., "A Lane Change Detection Approach using Feature Ranking with Maximized Predictive Power," 2014 IEEE Intelligent Vehicles Symposium (IV), Jun. 8-11, 2014, pp. 108-114 (seven (7) pages).
Salvucci, D. et al. "Lane-Change Detection Using a Computational Driver Model," Human Factors, Jun. 2007, pp. 532-542, vol. 49, No. 3 (11 pages).
United States Final Office Action issued in U.S. Appl. No. 16/951,195 dated Sep. 14, 2022 (33 pages).
Chinese-language Office Action issued in Chinese Application No. 201980035107.0 dated Dec. 27, 2023 with English translation (14 pages).

* cited by examiner

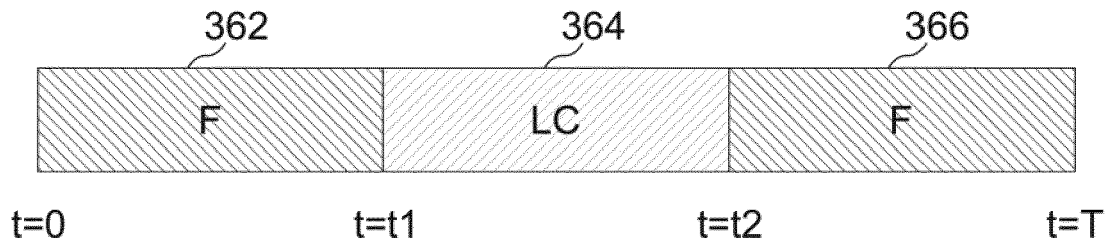
FIG. 3g
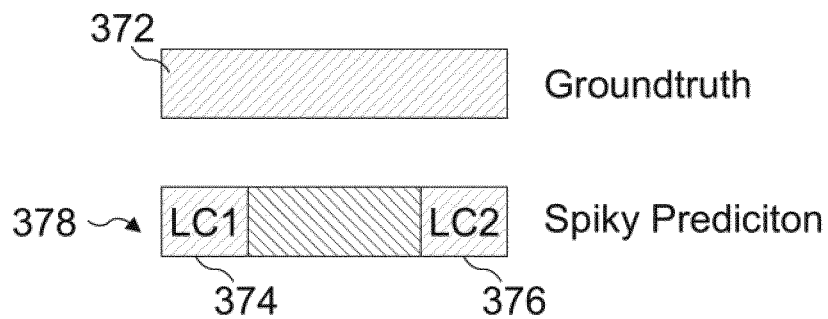
FIG. 3h
| Metric | Left | Follow | Right |
|---|---|---|---|
| Precision | 0.95 | 0.85 | 0.93 |
| Recall | 0.92 | 0.98 | 0.92 |
FIG. 3i

| Algorithm | Global Accuracy | | | B4c | | Maneuver-based Proposed | | | | | | | Rank |
|---|---|---|---|---|---|---|---|---|---|---|---|---|---|
| | L | F | R | F1 | TTM | L Miss | L Delay | L Over | F Freq | R Miss | R Delay | R Over | |
| NB | 0.715 | 0.886 | 0.679 | 0.0 | 0.0 | 0.002 | 0.269 | 0.64 | 7.271 | 0.003 | 0.295 | 0.595 | 3.75 |
| RF | 0.744 | 0.938 | 0.67 | 0.767 | 0.965 | 0.003 | 0.231 | 0.636 | 7.231 | 0.006 | 0.269 | 0.513 | 3.667 |
| SRNN | 0.555 | 0.905 | 0.475 | 0.475 | 1.337 | 0.212 | 0.22 | 0.521 | 6.686 | 0.121 | 0.355 | 0.4 | 4.917 |
| LSTM | 0.772 | 0.958 | 0.634 | 0.822 | 1.086 | 0.002 | 0.215 | 0.671 | 4.749 | 0.007 | 0.341 | 0.525 | 2.5 |
| LSTM-E | 0.759 | 0.962 | 0.603 | 0.813 | 1.093 | 0.003 | 0.228 | 0.666 | 4.327 | 0.012 | 0.363 | 0.493 | 3.417 |
| LSTM-A | 0.784 | 0.951 | 0.662 | 0.802 | 1.138 | 0.003 | 0.207 | 0.694 | 5.34 | 0.01 | 0.306 | 0.547 | 2.417 |

| Algorithm | Global Accuracy | | | B4c | | Maneuver-based Proposed | | | | | | | Rank |
|---|---|---|---|---|---|---|---|---|---|---|---|---|---|
| | L | F | R | F1 | TTM | L Miss | L Delay | L Over | F Freq | R Miss | R Delay | R Over | |
| NB | 0.767 | 0.773 | 0.879 | 0.0 | 0.0 | 0.062 | 0.083 | 0.622 | 3.461 | 0.025 | 0.04 | 0.759 | 4.667 |
| RF | 0.843 | 0.886 | 0.854 | 0.321 | 1.071 | 0.064 | 0.06 | 0.643 | 3.515 | 0.038 | 0.056 | 0.709 | 4.0 |
| SRNN | 0.868 | 0.834 | 0.852 | 0.275 | 0.691 | 0.054 | 0.087 | 0.782 | 2.28 | 0.05 | 0.09 | 0.771 | 4.833 |
| LSTM | 0.904 | 0.883 | 0.926 | 0.597 | 0.795 | 0.038 | 0.062 | 0.822 | 1.937 | 0.027 | 0.047 | 0.859 | 1.667 |
| LSTM-E | 0.898 | 0.884 | 0.916 | 0.487 | 0.757 | 0.052 | 0.061 | 0.807 | 2.247 | 0.043 | 0.048 | 0.852 | 2.917 |
| LSTM-A | 0.899 | 0.876 | 0.924 | 0.432 | 0.622 | 0.042 | 0.065 | 0.814 | 2.238 | 0.045 | 0.045 | 0.859 | 2.833 |

FIG. 4

Ground Truth: Left

Left: 80.91
Follow: 17.74
Right: 1.35

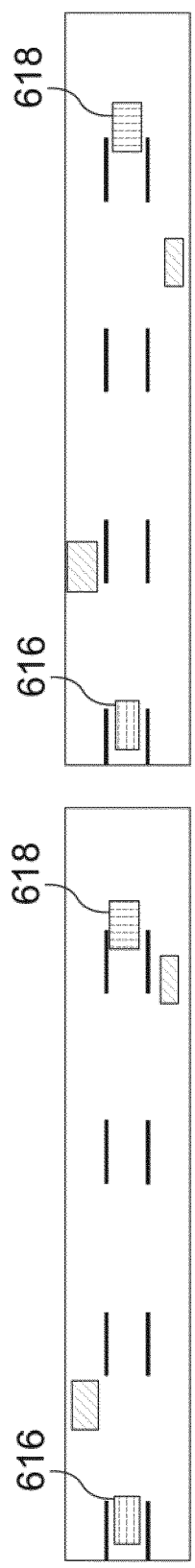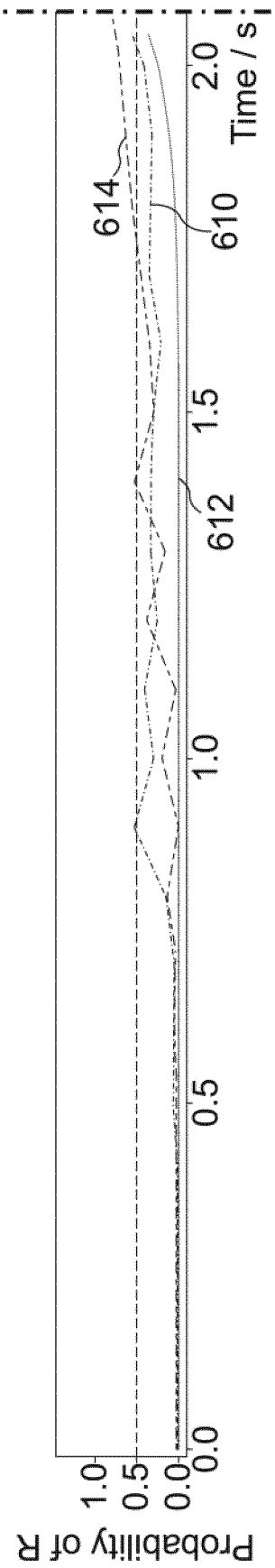
FIG. 6a
| FIG. 6a-1 | FIG. 6a-2 |
FIG. 6a-1

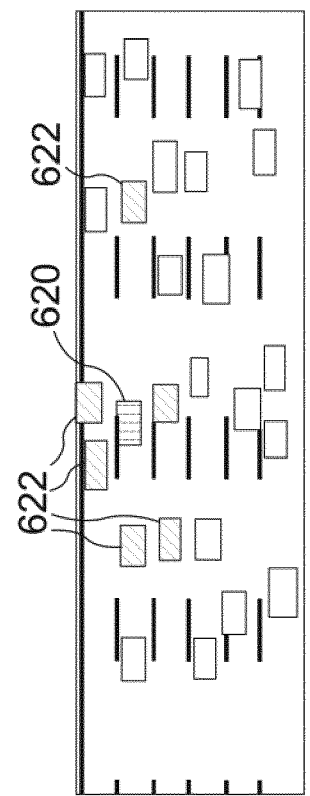
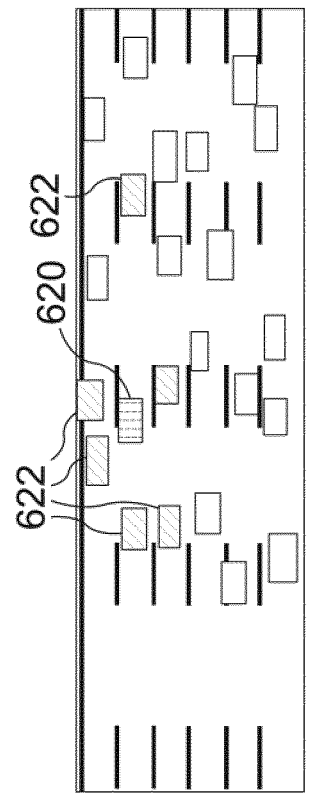
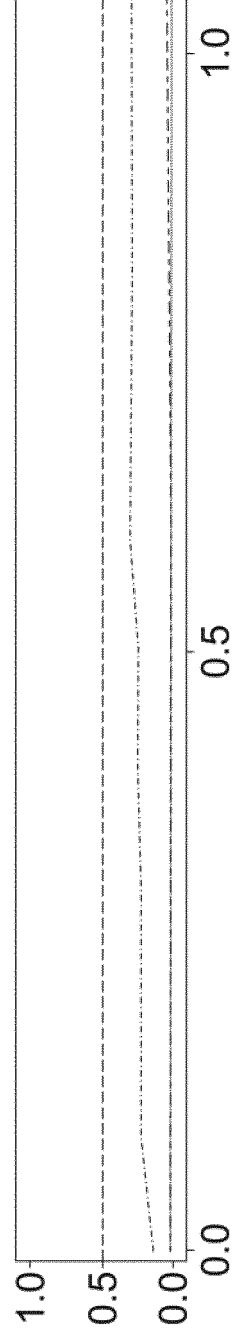
FIG. 6a
| FIG. 6b-1 | FIG. 6b-2 | FIG. 6b-3 |
FIG. 6b-1

METHOD AND APPARATUS FOR DETERMINING INFORMATION RELATED TO A LANE CHANGE OF TARGET VEHICLE, METHOD AND APPARATUS FOR DETERMINING A VEHICLE COMFORT METRIC FOR A PREDICTION OF A DRIVING MANEUVER OF A TARGET VEHICLE AND COMPUTER PROGRAM

BACKGROUND AND SUMMARY OF THE INVENTION

Embodiments relate to a method and an apparatus for determining information related to a lane change of a target vehicle, to a method and an apparatus for determining a vehicle comfort metric for a prediction of a driving maneuver of a target vehicle, and to a computer program, more specifically, but not exclusively, to predicting a lane change of a target vehicle using a machine-learning network with an attention mechanism.

Autonomous driving is a major focus in automotive research. In autonomous driving, making predictions on how other vehicles are going to behave is a key feature. Based on these predictions, an ego vehicle may determine how a traffic situation evolves around the ego vehicle, and the ego vehicle may be enabled to adjust its driving to the changing traffic situation. One important prediction is the prediction of lane changes of other vehicles. If a target vehicle in front of the ego vehicle changes its lane on a multi-lane road, e.g. from a ramp onto a highway or among lanes of a highway, there is a high likelihood that the ego vehicle has to adjust its velocity and heading as well, either as it is blocked by the lane-changing vehicle, or due to resulting lane changes of other vehicles.

There may be a demand to provide an improved concept for predicting a lane change of a target vehicle.

Such a demand may be satisfied by the subject matter of the claims.

At least some embodiments relate to a method for a vehicle. The method may be used to predict a lane change of a target vehicle using a machine-learning network. Within the machine-learning network, an attention mechanism, e.g. an attention layer, is used to selectively focus on input features of the network that are deemed of heightened importance. For example, if the target vehicle is close to a road ramp, a heightened focus may be set on mapping data input features to the machine-learning network; in dense traffic situations, the heightened focus may be on vehicles (directly) surrounding the target vehicle. Additionally, in at least some embodiments, the machine-learning network may be a recurrent machine-learning network, e.g. a recurrent neural network, so the lane change might not only be predicted based on the current input features of the machine-learning network, but also based on a previous state of the machine-learning network. To this effect, the machine-learning network may e.g. comprise Long Short Term Memory (LSTM) cells.

Embodiments provide a method for vehicle. The method is suitable for determining information related to a lane change of a target vehicle. The information related to the lane change of the target vehicle indicates, whether the target vehicle is expected to perform a lane change. The method comprises obtaining information related to an environment of the target vehicle. The information related to the environment relates to a plurality of features of the environment of the target vehicle. The plurality of features are partitioned into two or more groups of features. The method further comprises determining two or more weighting factors for the two or more groups of features. An attention mechanism is used for determining the two or more weighting factors. The method further comprises determining the information related to the lane change of the target vehicle based on the information related to the environment of the target vehicle using a machine-learning network. A weighting of the plurality of features of the environment of the target vehicle within the machine-learning network is based on the two or more weighting factors for the two or more groups of features.

Using a machine-learning network with an attention mechanism may enable both a better quality of the prediction of the lane change and a better interpretability of the prediction, as an evaluation of the prediction can show which of the input features have had an increased impact.

For example, the two or more groups of features comprise at least two elements of a group of features related to driving parameters of the target vehicle, a group of features related to one or more further vehicles in a vicinity of the target vehicle, and a group of features related to a static environment of the target vehicle. Grouping the input features into groups of features may enable separating the machine-learning network according to the grouping, e.g. using two or more LSTMs for the two or more groups of features.

In at least some embodiments, the information related to the environment of the target vehicle is based on processed sensor data of the vehicle and/or based on mapping data. For example, features of the group of features related to driving parameters of the target vehicle may be based on processed sensor data of the vehicle. Features of the group of features related to one or more further vehicles in a vicinity of the target vehicle may be based on processed sensor data of the vehicle. Features of the group of features related to a static environment of the target vehicle may be based on mapping data. Using input features of different sources, e.g. processed sensor data of the vehicle and mapping data, may improve a quality of the prediction, and may enable a selective focus among the input features.

In various embodiments, the machine-learning network comprises an attention layer. The attention layer may be used for determining the two or more weighting factors. The attention layer may be used to have a selective focus among input features or input feature groups of the machine-learning network.

For example, the attention layer may be configured to determine the two or more weighting factors based on features of the two or more groups of features. Additionally or alternatively, the attention layer may be configured to determine the two or more weighting factors based on current information related to the environment and based on a previous state of the attention layer. Using features that lie in different spaces and/or have different modalities may enable an improved selection of the focus. Furthermore, if the one or more weighting factors are determined based on current information related to the environment and based on a previous state of the attention layer, a continuous nature of the lane change prediction is considered within the determination of the one or more weighting factors.

In at least some embodiments, the method comprises repeating the determination of the information related to the lane change of the target vehicle. The two or more weighting factors may be re-determined for each repetition of the determination of the information related to the lane change of the target vehicle. This may enable an adjustment of the weighting situation to a current driving situation of the target vehicle.

In various embodiments, the machine-learning network is a recurrent machine-learning network. The machine-learning network may be configured to determine the information related to the lane change of the target vehicle based on current information related to the environment of the target vehicle and based on a previous state of the machine-learning network. This may take the continuous nature of the lane change prediction into account.

For example, the machine-learning network may comprise two or more long short term memory cells. The information related to the lane change of the target vehicle may be determined using the two or more long short term memory cells based on the current information related to the environment of the target vehicle and based on the previous state of the one or more long short term memory cells. This may take the continuous nature of the lane change prediction into account, as LSTMs are based on their current input features and their previous state. Additionally or alternatively, each of the two or more long short term memory cells may be associated with a group of features of the two or more groups of features. This may facilitate a weighting of the two or more groups of features within the machine-learning network by the attention mechanism.

In some embodiments, the method comprises conducting the vehicle based on the information related to the lane change of a target vehicle. For example, the vehicle may be conducted by accelerating or decelerating the vehicle and/or by steering the vehicle. This may enable reacting to the predicted lane change of the target vehicle.

For example, the information related to the lane change of the target vehicle may be determined to predict a lane change of the target vehicle. The predicted lane change may be used to alter the velocity or heading of the vehicle.

The method comprises determining the information related to a lane change of a target vehicle for a plurality of target vehicles located in a vicinity of the vehicle. This may enable predicting lane changes for the vehicles in the vicinity of the vehicle.

Embodiments further provide a method for determining a vehicle comfort metric for a prediction of a driving maneuver of a target vehicle. The method comprises obtaining information related to an extent of the driving maneuver of the target vehicle. The method further comprises obtaining information related to a prediction of the driving maneuver of the target vehicle. The method further comprises determining the vehicle comfort metric for the prediction of the driving maneuver based on a comparison of the information related to the extent of the driving maneuver and the information related to the prediction of the driving maneuver. The comfort metric is determined based on one or more elements of the group of a delay between a start of the driving maneuver and a first prediction of the driving maneuver, an overlap between the driving maneuver and the prediction of the driving maneuver, a number of discontinuous predictions of the driving maneuver, and a missed prediction of the driving maneuver. The vehicle comfort metric may be used to evaluate and improve prediction methods for predicting maneuvers of a target vehicle.

Embodiments further provide a computer program having a program code for performing at least one of the methods, when the computer program is executed on a computer, a processor, or a programmable hardware component.

Embodiments further provide an apparatus for a vehicle. The apparatus is suitable for determining information related to a lane change of a target vehicle. The information related to the lane change of the target vehicle indicates, whether the target vehicle is expected to perform a lane change. The apparatus comprises at least one interface for obtaining information related to an environment of the target vehicle. The information related to the environment relates to a plurality of features of the environment of the target vehicle. The plurality of features are partitioned into two or more groups of features. The apparatus comprises a computation module configured to determine two or more weighting factors for the two or more groups of features. An attention mechanism is used for determining the two or more weighting factors. The computation module is configured to determine the information related to the lane change of the target vehicle based on the information related to the environment of the target vehicle using a machine-learning network. A weighting of the plurality of features of the environment of the target vehicle within the machine-learning network is based on the two or more weighting factors for the two or more groups of features.

Embodiments further provide an apparatus for determining a vehicle comfort metric for a prediction of a driving maneuver of a target vehicle. The apparatus comprises at least one interface for obtaining information related to an extent of the driving maneuver of the target vehicle and for obtaining information related to a prediction of the driving maneuver of the target vehicle. The apparatuses further comprises a computation module configured to determine the vehicle comfort metric for the prediction of the driving maneuver based on a comparison of the information related to the extent of the driving maneuver and the information related to the prediction of the driving maneuver. The comfort metric is determined based on one or more elements of the group of a delay between a start of the driving maneuver and a first prediction of the driving maneuver, an overlap between the driving maneuver and the prediction of the driving maneuver, a number of discontinuous predictions of the driving maneuver, and a missed prediction of the driving maneuver.

Some examples of apparatuses and/or methods will be described in the following by way of example only, and with reference to the accompanying figures.

BRIEF DESCRIPTION OF THE DRAWINGS

FIG. 3*g* shows a sequence of events of a lane change maneuver as it progresses;

FIG. 3*h* shows time sequences of a lane change maneuver and of a corresponding prediction of the lane change maneuver;

FIG. 3*i* shows a table of a labeling of lane change maneuvers performed by human evaluators;

FIG. 4 shows a comparison and ranking of different prediction methods on different metrics;

DETAILED DESCRIPTION OF THE DRAWINGS

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1A:
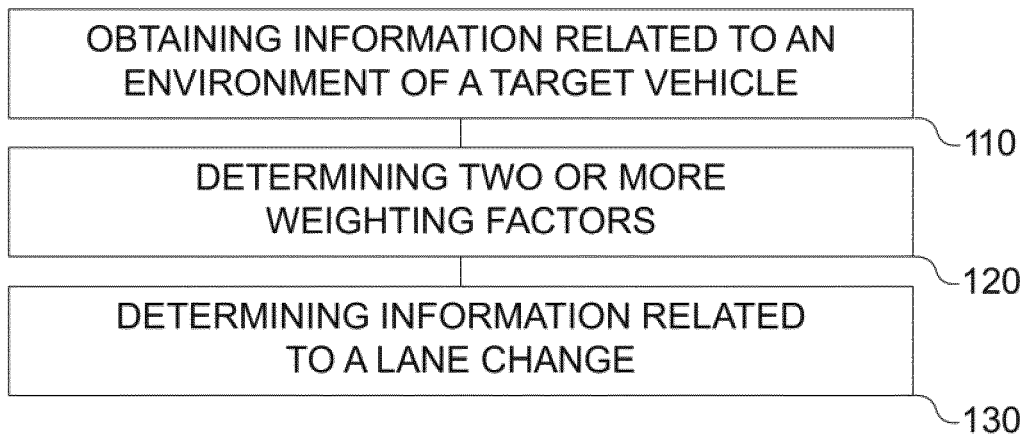
FIGS. 1a and 1b show flow charts of embodiments of a method for a vehicle.
Figure 1B:
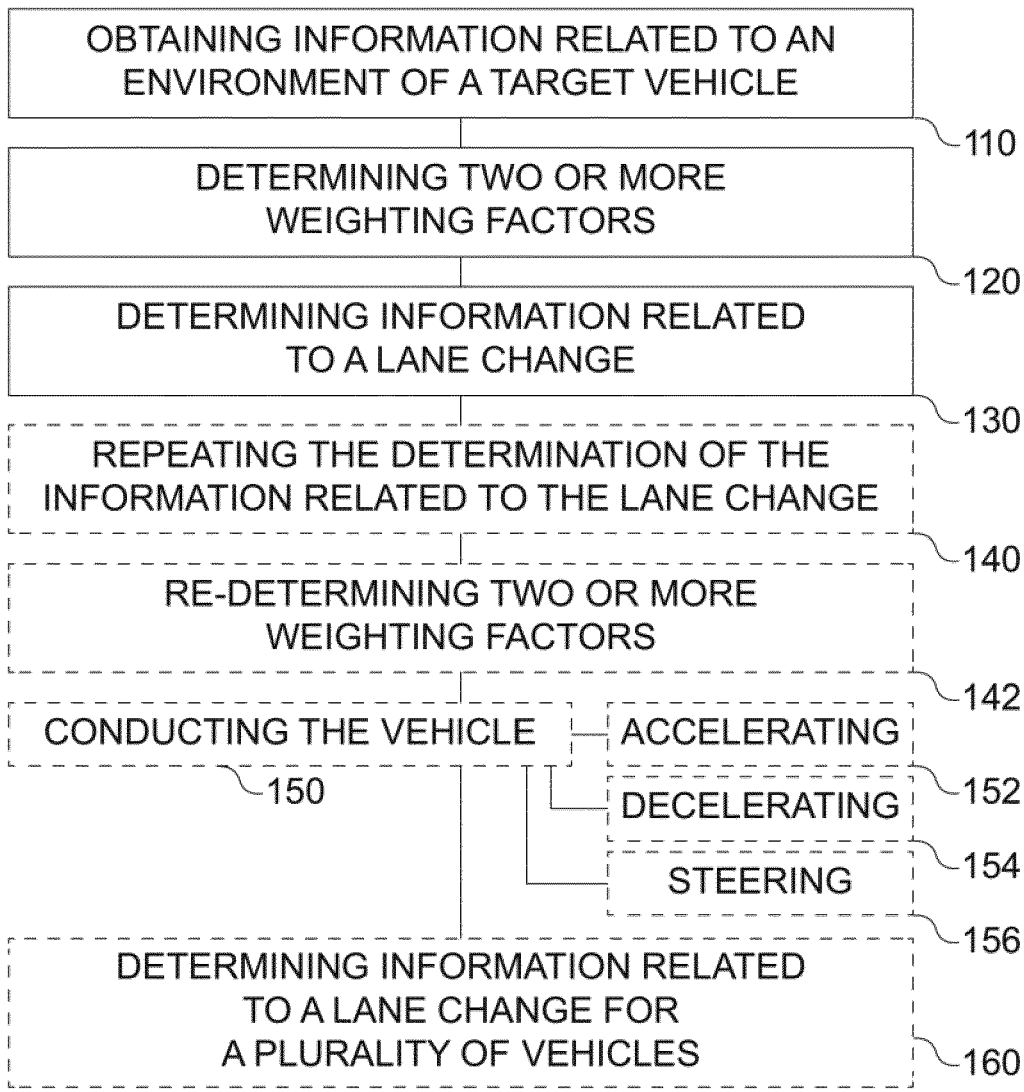

FIGS. 1*a* and 1*b* show flow charts of embodiments of a method for a vehicle 100. The method is suitable for determining information related to a lane change of a target vehicle. The information related to the lane change of the target vehicle indicates, whether the target vehicle is expected to perform a lane change. The method comprises obtaining 110 information related to an environment of the target vehicle. The information related to the environment relates to a plurality of features of the environment of the target vehicle. The plurality of features are partitioned into two or more groups of features. The method further comprises determining 120 two or more weighting factors for the two or more groups of features. An attention mechanism is used for determining the two or more weighting factors. The method further comprises determining 130 the information related to the lane change of the target vehicle based on the information related to the environment of the target vehicle using a machine-learning network. A weighting of the plurality of features of the environment of the target vehicle within the machine-learning network is based on the two or more weighting factors for the two or more groups of features.

Figure 1C:
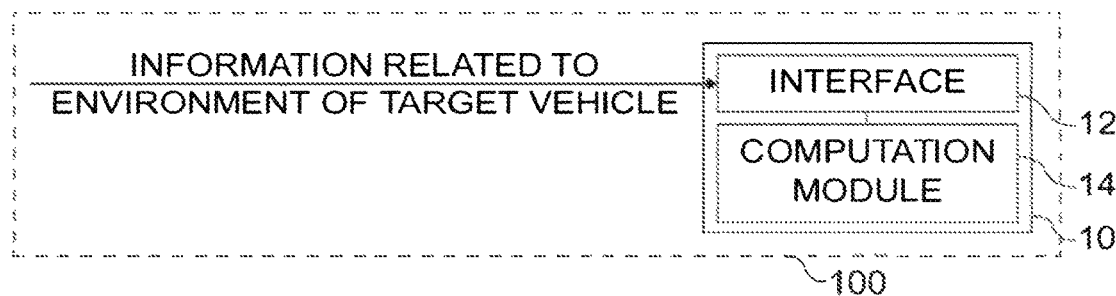
FIG. 1c shows a block diagram of an embodiment of an apparatus for a vehicle.

FIG. 1*c* shows a block diagram of an embodiment of an (corresponding) apparatus 10 for a vehicle 100. The apparatus 10 is suitable for determining information related to a lane change of a target vehicle. The information related to the lane change of the target vehicle indicates, whether the target vehicle is expected to perform a lane change. The apparatus 10 comprises at least one interface 12 for obtaining information related to an environment of the target vehicle. The information related to the environment relates to a plurality of features of the environment of the target vehicle. The plurality of features are partitioned into two or more groups of features. The apparatus 10 comprises a computation module 14 configured to determine two or more weighting factors for the two or more groups of features. An attention mechanism is used for determining the two or more weighting factors. The computation module 14 is configured to determine the information related to the lane change of the target vehicle based on the information related to the environment of the target vehicle using a machine-learning network. A weighting of the plurality of features of the environment of the target vehicle within the machine-learning network is based on the two or more weighting factors for the two or more groups of features. The at least one interface 12 is coupled to the computation module 14. FIG. 1*c* further shows the vehicle 100 comprising the apparatus 10. For example, the method features of the method introduced in connection with FIGS. 1*a* and 1*b* may be executed by the vehicle 100. The computation module 14 may be configured to execute the method features/steps introduced in connection with FIGS. 1*a* and/or 1*b*, e.g. in conjunction with the at least one interface 12.

The following description relates to both the method of FIGS. 1*a* and/or 1*b* and the apparatus 10 of FIG. 1*c*.

Embodiments of the method and/or the apparatus are suitable for determining information related to a lane change of the target vehicle. In other words, the method and/or the apparatus may be used to determine, whether the target vehicle, which may be a vehicle located in front of the vehicle 100, is likely to perform a lane change, e.g. to move from a first lane to a second lane of the same road. For example, the information related to the lane change of the target vehicle may be determined to predict the lane change of the target vehicle. The information related to the lane change of the target vehicle may comprise information related to a probability of a lane change of the target vehicle at a pre-determined point or phase of time, and/or information related to a predicted start and/or end of the lane change maneuver. In other words, the information related to the lane change of the target vehicle may comprise the information related to the lane change that may be used by an autonomous driving module or by a semi-autonomous driving module of the vehicle to adjust the driving of the vehicle. For example, the method may comprise providing the information related to the lane change of the target vehicle to a semi-autonomous or autonomous driving module of the vehicle 100, e.g. via the at least one interface 12.

Embodiments of the method and/or the apparatus are suitable for determining information related to a lane change of the target vehicle. For example, the target vehicle is a vehicle that is located on the same road as the vehicle 100, e.g. in front of the vehicle 100. The vehicle 100 might determine the information related to the lane change for a plurality of vehicles located in the vicinity of the vehicle 100, e.g. to predict lane changes for the plurality of vehicles located in the vicinity of the vehicle 100. For example, the method may comprise determining 160 the information related to a lane change of a target vehicle for a plurality of target vehicles located in a vicinity of the vehicle 100, e.g. individually for each target vehicle of the plurality of target vehicles. The method may comprise sequentially determining 160 the information related to a lane change for the plurality of target vehicles located in the vicinity of the vehicle 100. For example, the plurality of (target) vehicles may be located on the same road as the vehicle 100, e.g. including adjacent road structures such as highway ramps. For example, the target vehicle may be vehicle of a plurality of vehicles located in the vicinity of the vehicle 100.

The method comprises obtaining 110 information related to an environment of the target vehicle. The information related to the environment relates to a plurality of features of the environment of the target vehicle. The plurality of features are partitioned into two or more groups of features. For example, the two or more groups of features may comprise a group of features related to driving parameters of the target vehicle, a group of features related to one or more further vehicles in a vicinity of the target vehicle, and/or a group of features related to a static environment of the target vehicle. The group of features related to driving parameters of the target vehicle may comprise at least one element of the group of information related to a longitudinal (e.g. in the direction of travel) velocity of the target vehicle, information related to a lateral (e.g. orthogonal to the direction of travel) velocity of the target vehicle, information related to a longitudinal acceleration of the target vehicle, information related to a lateral acceleration of the target vehicle and information related to a heading angle of the target vehicle. The group of features related to one or more further vehicles in a vicinity of the target vehicle may comprise one or more elements of the group of a (temporal) distance of a vehicle driving in front of the target vehicle in the same lane, a (temporal) distance of a vehicle driving in front of the target vehicle in an adjacent lane (left or right), a (temporal) distance of a vehicle driving behind the target vehicle in the same lane and a (temporal) distance of a vehicle driving behind the target vehicle in an adjacent lane (left or right). A temporal distance may be the distance between the vehicles, divided by the velocity of the trailing vehicle. The group of features related to a static environment of the target vehicle may comprise one or more features related to a static environment of the target vehicle, e.g. features of the road the target vehicle is travelling on. For example, the group of features related to a static environment of the target vehicle may comprise information related to a distance of the target vehicle from a ramp, information related to a number of lanes of the road the target vehicle is travelling on, and/or information related to a change in the number of lanes of the road the target vehicle is travelling on. The term "features" as used here relates to input data or input data sets for the machine-learning network. For example, a feature may be an individual measurable property or characteristic of a phenomenon being observed, e.g. of the driving parameters of the target vehicle, of the one or more further vehicles in a vicinity of the target vehicle or of the static environment of the target vehicle.

In at least some embodiments, the information related to the environment of the target vehicle is based on processed sensor data of the vehicle 100 and/or based on mapping data. For example, the processed sensor data might not be "raw" sensor data, but sensor data, in which the features are isolated, e.g. to facilitate a processing by the machine-learning network. The processed sensor data may be processed perception sensor data. The vehicle 100 may comprise one or more perception sensors, e.g. at least one of a LIDAR (Light Detection and Ranging) sensor, a Radar sensor, a time-of-flight (TOF) sensor and a camera sensor, which may be configured to provide sensor data. The vehicle may further comprise one or more computation modules configured to process the sensor data of the LIDAR/Radar/TOF/camera sensor data, to provide the processed sensor data. The method may comprise obtaining the processed sensor data from the one or more computation modules. For example, features of the group of features related to driving parameters of the target vehicle may be based on processed sensor data of the vehicle 100. Features of the group of features related to one or more further vehicles in a vicinity of the target vehicle may be based on processed sensor data of the vehicle 100. Features of the group of features related to a static environment of the target vehicle may be based on mapping data, e.g. based on cartographic information.

In the following, the terms "previous" and "current" may be used, e.g. to denote "previous" or "current" information related to the environment of the target vehicle, a "previous" state of the machine-learning network, a "previous" state of an attention layer etc. The terms "previous" and "current" may relate to time steps, for which the method is executed. For example, a current time step may be a time step, for which the (current) information related to the environment of the target vehicle is used to determine the information related to the lane change of the target vehicle, and a previous time step may be a time step that (directly) precedes the current time step. In at least some embodiments, as shown in FIG. 1b, the method comprises repeating 140 the determination of the information related to the lane change of the target vehicle. For example, in t=0, the information related to the lane change may be determined for a first time. The information related to the environment of the target vehicle at t=0 may be the current information related to the environment of the target vehicle, and there might not be previous information related to the environment of the target vehicle or no previous state of the machine-learning network. In t=1, the determination of the information related to the lane change may be repeated 140. In this case, the information related to the environment of the target vehicle at t=1 may be the current information related to the environment of the target vehicle, the information related to the environment of the target vehicle at t=0 may be the previous information related to the environment of the target vehicle, and the state of the machine-learning network at t=0 may be the previous state of the machine-learning network.

The method comprises determining 120 two or more weighting factors for the two or more groups of features. The weighting of the plurality of features of the environment of the target vehicle within the machine-learning network is based on the two or more weighting factors for the two or more groups of features. For example, the two or more weighting factors may indicate, how much weight is placed on a group of features of the two or more groups of features in the determination of the information related to the lane change of the target vehicle. An attention mechanism is used for determining the two or more weighting factors. An attention mechanism may be a mechanism for determining a selective focus on a subset of features of a plurality of input features. For example, the attention mechanism may be suitable for assigning weights to the groups of features of the two or more groups of features. For example, the machine-learning network may comprise an attention layer. The attention layer may be used for determining the two or more weighting factors. The attention layer may implement the attention mechanism. The attention layer may be trained to assign weights to the groups of features of the two or more groups of features, e.g. using features of the two or more groups of features and/or a previous state of the attention layer as training input. For example, the previous state of the attention layer may comprise previous information related to the environment and/or previous weights generated by the attention layer. The attention layer may be configured to determine the two or more weighting factors based on features of the two or more groups of features. The two or more groups of features may be input features for the attention layer. In at least some embodiments, the attention layer is configured to determine the two or more weighting factors based on current information related to the environment and based on a previous state of the attention layer (e.g. based on a previous information related to the environment). Along with the two or more groups of features, the previous state of the attention layer may be input features of the attention layer. The two or more weighting factors may be re-determined 142 for each repetition of the determination of the information related to the lane change of the target vehicle.

The method comprises determining 130 the information related to the lane change of the target vehicle based on the information related to the environment of the target vehicle using a machine-learning network. For example, the information related to the environment of the target vehicle, e.g. the plurality of features and/or the two or more feature groups, may be the input features of the machine-learning network. For example, the machine-learning network may be a recurrent machine-learning network, e.g. a recurrent neural network. In other words, the machine-learning network may be configured to determine the information related to the lane change of the target vehicle based on current information related to the environment of the target vehicle and based on a previous state of the machine-learning network. For example, the previous state of the machine-learning network may comprise previous information related to the environment of the target vehicle and/or previously determined information related to the lane change of the target vehicle.

In an exemplary embodiment, the machine-learning network comprises two or more long short term memory (LSTM) cells for the two or more groups of features, e.g. three LSTM cells for three groups of features. The information related to the lane change of the target vehicle may be determined 130 using the two or more long short term memory cells based on the current information related to the environment of the target vehicle and based on the previous state of the one or more long short term memory cells. Each of the two or more long short term memory cells may be associated with a group of features of the two or more groups of features. For example, each LSTM cell may process (exactly) one group of features of the two or more group of features as input features.

In various embodiments, as further shown in FIG. 1b, the method comprises conducting 150 (e.g. autonomously or semi-autonomously driving) the vehicle 100 based on the information related to the lane change of a target vehicle. For example, the vehicle 100 may be accelerating 152 or decelerating 154 based on the information related to the lane change of a target vehicle. Alternatively or additionally, the method may comprise steering 156 the vehicle 100 based on the information related to the lane change of a target vehicle.

For example, the vehicle 100 and/or the target vehicle may be a land vehicle, a road vehicle, a car, an automobile, an off-road vehicle, a motor vehicle, a truck or a lorry. In at least some embodiments, the vehicle 100 and/or the target vehicle may be autonomously or semi-autonomously operated vehicles.

Figure 1D:
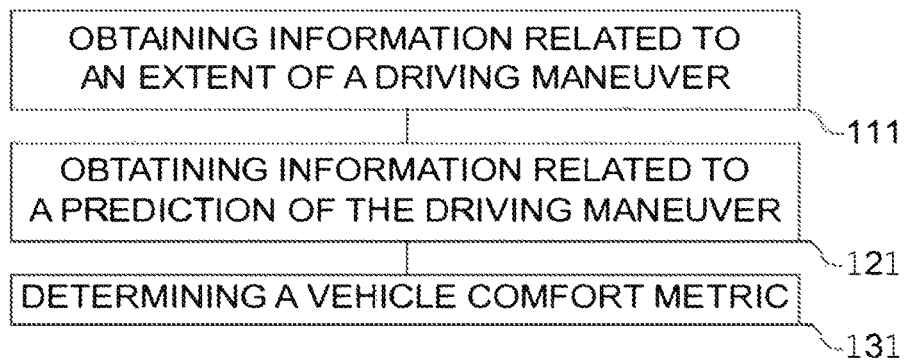
FIG. 1d shows a flow chart of an embodiment of a method for determining a vehicle comfort metric for a prediction of a driving maneuver of a target vehicle.
Figure 1E:
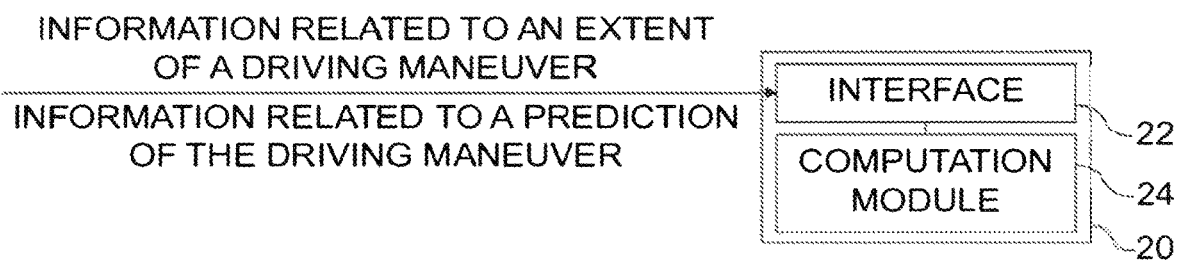
FIG. 1e shows a block diagram of an embodiment of an apparatus for determining a vehicle comfort metric for a prediction of a driving maneuver of a target vehicle.

The at least one interface 12 (and/or at least one interface 22 as introduced in connection with FIG. 1e) may correspond to one or more inputs and/or outputs for receiving and/or transmitting information, which may be in digital (bit) values according to a specified code, within a module, between modules or between modules of different entities.

In embodiments the computation module 14 (and/or a computation module 24 as introduced in connection with FIG. 1e) may be implemented using one or more computing units, one or more computing devices, any means for computing, one or more processing units, one or more processing devices, any means for processing, such as a processor, a computer or a programmable hardware component being operable with accordingly adapted software. In other words, the described function of the computation module 14; 24 may as well be implemented in software, which is then executed on one or more programmable hardware components. Such hardware components may comprise a general purpose processor, a Digital Signal Processor (DSP), a micro-controller, etc.

More details and aspects of the method and/or the apparatus 10 are mentioned in connection with the proposed concept or one or more examples described above or below (e.g. FIG. 1d to 6b). The method and/or the apparatus 10 may comprise one or more additional optional features corresponding to one or more aspects of the proposed concept or one or more examples described above or below.

FIG. 1d shows a flow chart of an embodiment of a method for determining a vehicle comfort metric for a prediction of a driving maneuver of a target vehicle. The method comprises obtaining 111 information related to an extent of the driving maneuver of the target vehicle. The method further comprises obtaining 121 information related to a prediction of the driving maneuver of the target vehicle. The method further comprises determining 131 the vehicle comfort metric for the prediction of the driving maneuver based on a comparison of the information related to the extent of the driving maneuver and the information related to the prediction of the driving maneuver. The comfort metric is determined based on one or more elements of the group of a delay between a start of the driving maneuver and a first prediction of the driving maneuver, an overlap between the driving maneuver and the prediction of the driving maneuver, a number of discontinuous predictions of the driving maneuver, and a missed prediction of the driving maneuver.

FIG. 1e shows a block diagram of an embodiment of a (corresponding) apparatus 20 for determining a vehicle comfort metric for a prediction of a driving maneuver of a target vehicle. The apparatus 20 comprises at least one interface 22 for obtaining information related to an extent of the driving maneuver of the target vehicle and for obtaining information related to a prediction of the driving maneuver of the target vehicle. The apparatus 20 comprises a computation module 24 configured to determine the vehicle comfort metric for the prediction of the driving maneuver based on a comparison of the information related to the extent of the driving maneuver and the information related to the prediction of the driving maneuver. The comfort metric is determined based on one or more elements of the group of a delay between a start of the driving maneuver and a first prediction of the driving maneuver, an overlap between the driving maneuver and the prediction of the driving maneuver, a number of discontinuous predictions of the driving maneuver, and a missed prediction of the driving maneuver. The at least one interface 22 is coupled to the computation module 24. The computation module 24 may be configured to execute the method features/steps of the method of FIG. 1d, e.g. in conjunction with the at least one interface 22.

The following description relates to both the method of FIG. 1d and the apparatus 20 of FIG. 1e.

The method and/or the apparatus are suitable for determining a vehicle comfort metric for a prediction of a driving maneuver of a target vehicle. For example, as introduced in connection with FIGS. 1a to 1c, the driving maneuver may be or may comprise a lane change maneuver. For example, the driving maneuver may be an overtaking maneuver or a merge maneuver comprising a lane change maneuver. The vehicle comfort metric may indicate a comfort level that is enabled by the prediction of the driving maneuver of the target vehicle. For example, the vehicle comfort metric may be used to evaluate one or more driving maneuver prediction methods, e.g. to choose a driving maneuver prediction method that enables an improved comfort within a vehicle using the prediction method (e.g. not the target vehicle). In at least some embodiments, the method may be executed offline, e.g. outside a vehicle. The determination of the vehicle comfort metric may be based on offline information related to an extent of the driving maneuver of the target vehicle, e.g. recorded or simulated information related to the extent of the driving maneuver of the target vehicle and/or based on offline information related to a prediction of the driving maneuver of the target vehicle, information related to a prediction of the driving maneuver of the target vehicle simulated outside a vehicle. The target vehicle may be a "real" target vehicle, e.g. the driving maneuver may be executed by an actual target vehicle and the information related to the extent of the driving maneuver may be based on the driving maneuver as executed by the actual target vehicle, or the target vehicle may be a simulated target vehicle, e.g. the driving maneuver may be executed in a computer simulation. For example, the information related to an extent of the driving maneuver of the simulated target vehicle may be based on the simulated driving maneuver. In at least some embodiments, the extent of the driving maneuver may be automatically determined, e.g. based on a lateral acceleration or based on a lateral velocity of the target vehicle. Alternatively, the extent of the driving maneuver may be determined manually. The information related to the extent of the driving maneuver may comprise or indicate one or more elements of the group of a duration of the driving maneuver, a start time of the driving maneuver, and an end time of the driving maneuver.

The method comprises obtaining 121 information related to a prediction of the driving maneuver of the target vehicle. For example, the information related to the prediction of the driving maneuver may comprise or indicate one or more elements of the group of one or more predicted durations of the driving maneuver (within one actual driving maneuver, the prediction might determine one or more predicted driving maneuvers) and a first predicted start of the driving maneuver (of a first predicted driving maneuver of the one or more predicted driving maneuvers).

The method comprises determining 131 the vehicle comfort metric for the prediction of the driving maneuver based on a comparison of the information related to the extent of the driving maneuver and the information related to the prediction of the driving maneuver.

For example, the method may comprise evaluating a prediction method (e.g. the method for determining the information related to the lane change of the target vehicle) based on the determined 131 vehicle comfort metric.

The comfort metric may be determined based on a delay between a start of the driving maneuver and a first prediction of the driving maneuver, e.g. based on a comparison of the start time of the driving maneuver and the first predicted start of the driving maneuver. The earlier the prediction, the more time a vehicle using the prediction has to adjust its driving. The comfort metric may be determined based on an overlap between the driving maneuver and the prediction of the driving maneuver, e.g. based on a comparison between the entire duration of the driving maneuver and a duration during that driving maneuver, during which the driving maneuver has been predicted. The comfort metric may be determined based on a number of discontinuous predictions of the driving maneuver, e.g. based on how many predictions are made within the extent of the driving maneuver that lead to gaps between the individual predictions. The comfort metric may be determined based on a missed prediction of the driving maneuver, e.g. based on whether the driving maneuver is missed/unrecognized entirely.

More details and aspects of the method and/or the apparatus 10 are mentioned in connection with the proposed concept or one or more examples described above or below (e.g. FIG. 1d to 6b). The method and/or the apparatus 10 may comprise one or more additional optional features corresponding to one or more aspects of the proposed concept or one or more examples described above or below.

At least some embodiments provide an attention-based lane change prediction, which may be based on comfort-related metrics.

Predictions are a major factor in the implementation of autonomous driving. The prediction of lane changes is of particular importance, as lane changes are often executed at high speeds. Furthermore, lane changes are responsible for 18% of accidents.

In some systems, conventional approaches of machine learning are used, e.g. so-called support vector machines or random forests, or the usage of simple recurrent neural networks. In these approaches, the input features (such as velocity, lateral acceleration etc.) are concatenated and passed on to the methods.

There are a multitude of evaluation criteria to evaluate the quality of lane change predictions in autonomous driving. The evaluation criteria may be motivated by information collection, so the evaluation criteria for each time step may be determined independent from other time steps.

Unfortunately, in many cases, a lane change maneuver cannot not be considered as a single time step, but as a continuous process that comprises multiple time steps.

For example, a prediction may be discontinuous, which may lead to multiple brake and acceleration maneuvers in a lane change maneuver. Another scenario, in which the driving comfort is affected, is a scenario in which the prediction is made at a late point in time, which may lead to jumpy accelerations or decelerations. The evaluation criteria used in other systems might not consider these factors.

Furthermore, in some systems, all factors might be considered simultaneously, which may lead to errors in corner cases. The driving comfort might not be deductible from the evaluation criteria. Every time step might be considered separately, not as continuous event.

Figure 2A:
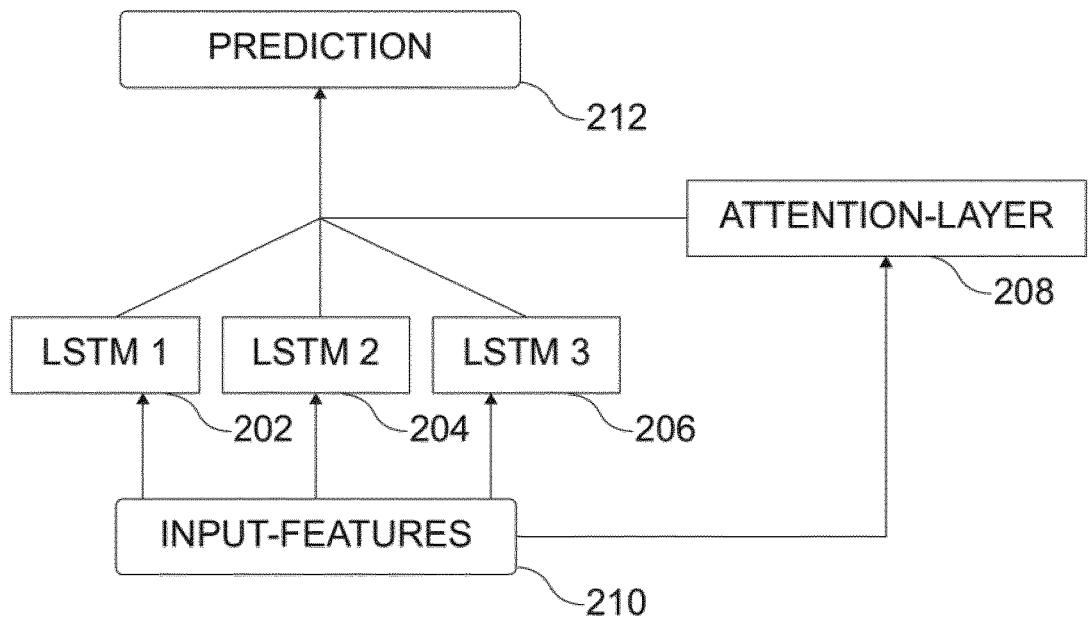
FIG. 2a shows a block diagram of a distributed Long Short Term Memory with an attention layer.

In at least some embodiments, a recurrent neural network (e.g. the machine-learning network introduced in connection with FIGS. 1a to c), comprising so-called LSTM-cells (Long Short Term Memory-cells), may be used for prediction. FIG. 2a shows a block diagram of a distributed LSTM with an attention layer 208 (e.g. the attention mechanism). Input features 210 (e.g. the plurality of features) are provided to LSTMs 202; 204; 206 and the attention layer 208, and the prediction 212 is determined based on the LSTMs 202; 204; 206 and based on the attention layer 208. This network may for example comprise three separate LSTM-cells, that each cover pre-defined properties, e.g. features of the target vehicle, map information etc. ("decoupling"). Furthermore, in at least some embodiments, this network may be extended with an "attention layer" (e.g. the attention mechanism). Embodiments may provide a mechanism, that enables the network to focus, based on the current situation, on certain properties. One example is the passing of a highway ramp. In this scenario, there is a very high probability that the vehicle on the ramp is going to perform a lane change. In this case, the system might focus on the static properties of the environment (e.g. street data, the group of features related to a static environment of the target vehicle) and perform the prediction based on this focus. This may avoid erroneous interpretations of other properties. A further positive side effect of using the attention mechanism may be the interpretability of the result of the prediction: By interpreting the result, it might be reconstructed and evaluated, which features/properties had an elevated impact on the prediction.

Figure 2B:
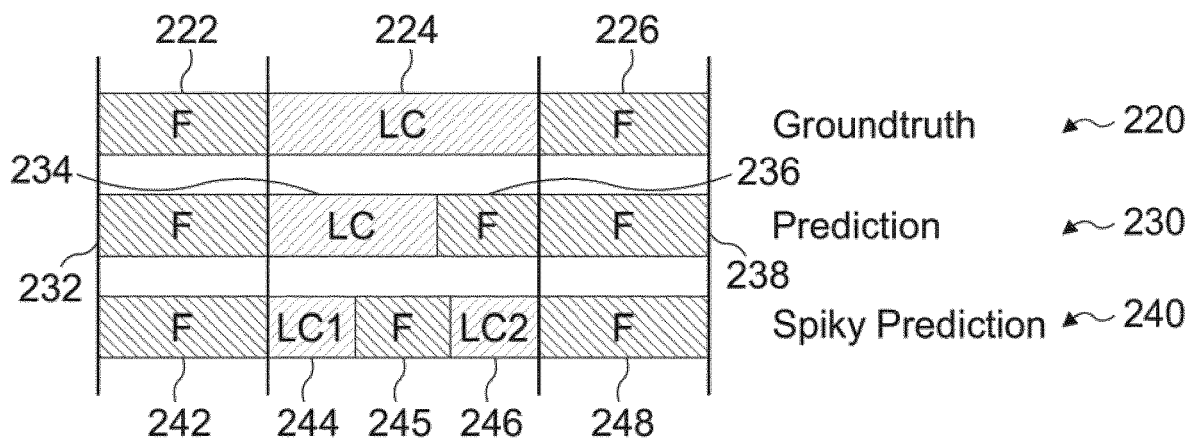
FIG. 2b shows a schematic diagram of a prediction of a lane change with a corresponding evaluation based on comfort-related metrics.

Furthermore, at least some embodiments may provide an evaluation criterion (e.g. the vehicle comfort metric) that interprets a lane change as comprehensive, continuous event, and which indicates a driver/driving comfort (e.g. "comfort-related metrics"). For example, at least some of the following four evaluation criteria may be used: The Delay that occurs between the actual event and the prediction. The higher the delay, the less time remains for braking or accelerating, and the more jumpy the reaction may become. The Overlap may represent the relative ratio of the first correct prediction of a lane change to the actual lane change maneuver. The higher the overlap, the more smooth or less jumpy the reaction may be. The Frequency may indicate, how often a certain prediction is made during a single lane change. The ideal case would be a Frequency of 1, as it might only lead to a single acceleration or deceleration. The fourth criterion may be denoted "Miss". The Miss may represent the number of unrecognized lane changes. The more lane changes are unrecognized, the more often the driver may have to intervene and the less comfortable the drive may become. In FIG. 2b, an example of a prediction of a lane change with a corresponding evaluation based on the comfort related metrics is shown.

FIG. 2b shows the segmentation of a drive in different time steps. "F" may denote "Follow" and LC may denote "Lane Change". Bar 220 shows the time span of the actual lane change maneuver ("Groundtruth"). In bar partitions 222 and 226, the target vehicle follows, e.g. remains within its lane, and in bar partition 224, the target vehicle performs a lane change. Bars 230 and 240 show possible predictions, wherein prediction 230 is favorable, as the prediction 234 is not discontinuous, as the predictions 244 and 246 in spiky prediction 240. Within the predictions 230 and 240, bar partitions 232, 238, 242 and 248 show the accurate prediction of the "Following" of the target vehicle, bar partitions 234, 244, and 246 show the accurate prediction of the lane change for a part of the actual lane change maneuver 224, and bar partitions show the erroneous prediction of a "Following" of the target vehicle.

In embodiments, erroneous interpretations may be reduced by a targeted focus on relevant properties. The interpretability of the prediction may be increased. The evaluation criteria may enable drawing conclusions about the driving/driver's comfort. The lane change maneuver may be considered as a continuous process.

More details and aspects of the prediction concept and/or of the comfort-related metrics are mentioned in connection with the proposed concept or one or more examples described above or below (e.g. FIG. 1a to 1e, 2a to 6b). The prediction concept and/or of the comfort-related metrics may comprise one or more additional optional features corresponding to one or more aspects of the proposed concept or one or more examples described above or below.

Lane change prediction of surrounding vehicles may be a key building block of path planning. The focus often is on increasing the accuracy of prediction by posing it purely as a function estimation problem at the cost of model's understandability. However, the efficacy of any lane change prediction model might be improved when both corner and failure cases are humanly understandable. An attention based recurrent model (e.g. implemented in the machine-learning network) is proposed to tackle both understandability and prediction quality. Furthermore, metrics are presented which reflect the discomfort felt by the driver. In at least some embodiments, encouraging results on a publicly available dataset and proprietary fleet data is shown.

In many cases, artificial intelligence is seen as the key enabler for fully autonomous driving. Sensing and Mapping, Perception, and (Path) Planning are often seen as the building blocks of any non end-to-end autonomous system. The rise of deep learning has led to an unprecedented progress in Mapping and Perception. However, path planning has a hybrid nature—it tends to be model driven with some sub-components learned using deep learning. This might primarily be due to the severely complex interaction of different agents (static and dynamic) and prior knowledge (map and traffic information). Dearth of data which includes various corner cases further limits completely data-driven based planning.

Prediction may be considered a crucial part of autonomous driving, serving as a 'construction block' for tasks like Path Planning, Adaptive Cruise Control, Side Collision Warning etc. At least some embodiments may address the issue of predicting lane changes of vehicles. This might be of paramount importance, as around 18% of all accidents happen during lane change maneuvers, and lane changes are often executed in high-velocity situations, e.g. on highways. A precise prediction may thus decrease risk and may enable safer driving. This security gain stemming from a sensitive prediction is one side of the coin. On the other hand, though, false predictions might have to be avoided as they may have a negative influence on the driver comfort. Each false prediction might results in unnecessary braking or acceleration.

For predicting lane changes, several "classical" models, like Support Vector Machines (SVMs) or Random Forests might be used. These classical methods, though theoretically sound, might see maneuver prediction as function estimation. Though the weights on different features may give a hint as to what the function considers important, understanding these models when prior knowledge is also given as input may lack clarity in analysis. The question to be asked might be: does/can a system see what a human looks at? For example, when a driver approaches a highway entry ramp, the probability of a lane change for vehicles on the ramp is higher, and the human driver slows down with this prior knowledge (see FIG. 3a).

Figure 3A:
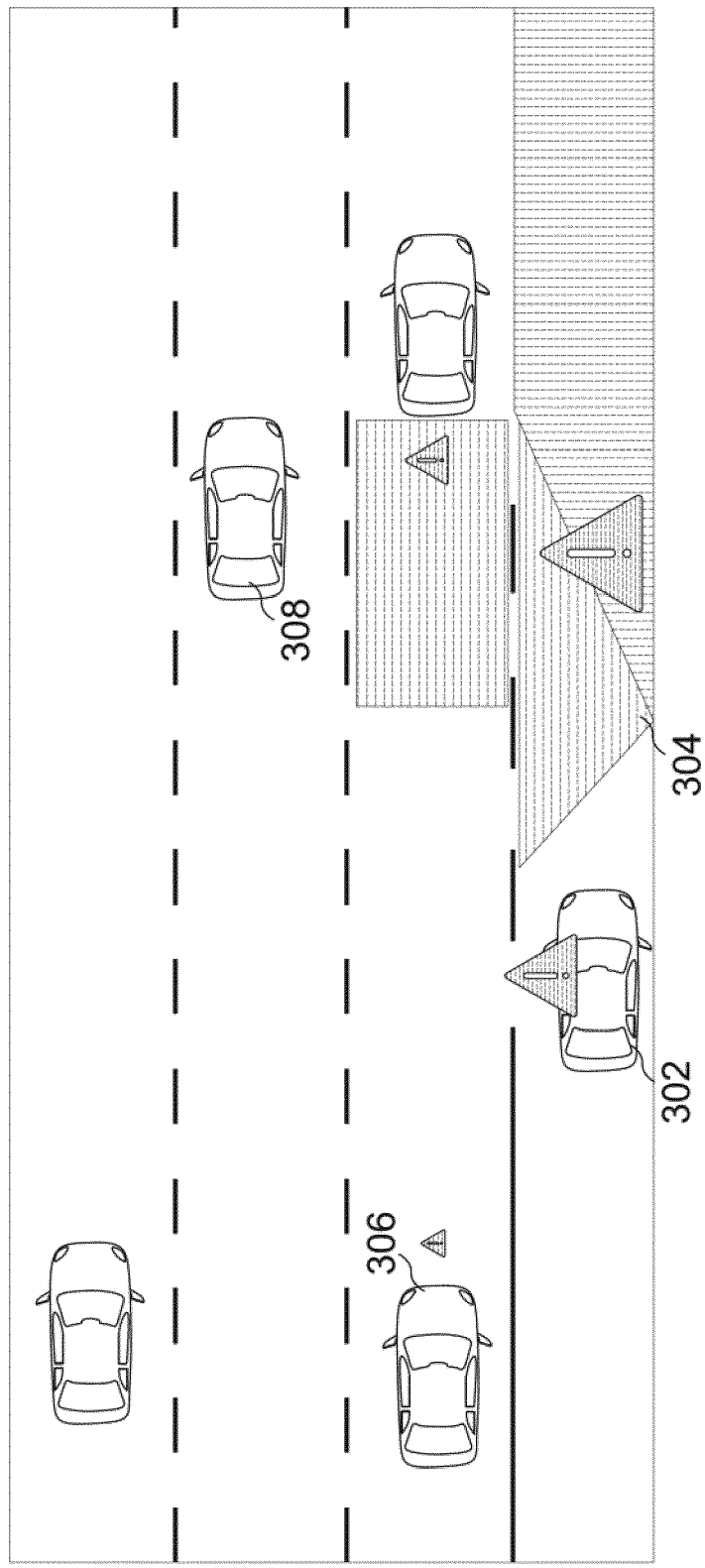
FIG. 3a shows a sample image of how an attention mechanism may perceive a scene.

FIG. 3a shows a sample image of how an attention mechanism may perceive a scene: when predicting the imminent lane change of the target car 302, a strong weight may be given to the ending on-ramp 304. Furthermore, intrinsic features of the target, like lateral velocity, also may get a high weight—as they are good indicators in general. A small weight might be given to the neighbored cars 308 on the adjacent lane—the gap might be determined not critical for this merging maneuver. The ego car 306 thus may slow down smoothly.

To answer the above intriguing question, embodiments may provide:
a) a recurrent neural network (e.g. the machine-learning network) making use of an attention mechanism over different features and time steps. This model may be designed to understand complex situations and may also explain its decisions. Like humans, it may shift its focus towards certain important aspects of the current scene.
b) introduce metrics (e.g. the vehicle comfort metric) which may indirectly reflect driver's comfort, and thus might allow a meaningful quantification of prediction quality.
c) provide a comprehensive evaluation of several models aimed at the same task on the same benchmark, and analyze critical corner cases and visually interpret them.
d) use the publicly available NGSIM (Next Generation Simulation) dataset as well as proprietary fleet data (FIG. 3b) to demonstrate encouraging results with respect to other methods.

Figure 3B:
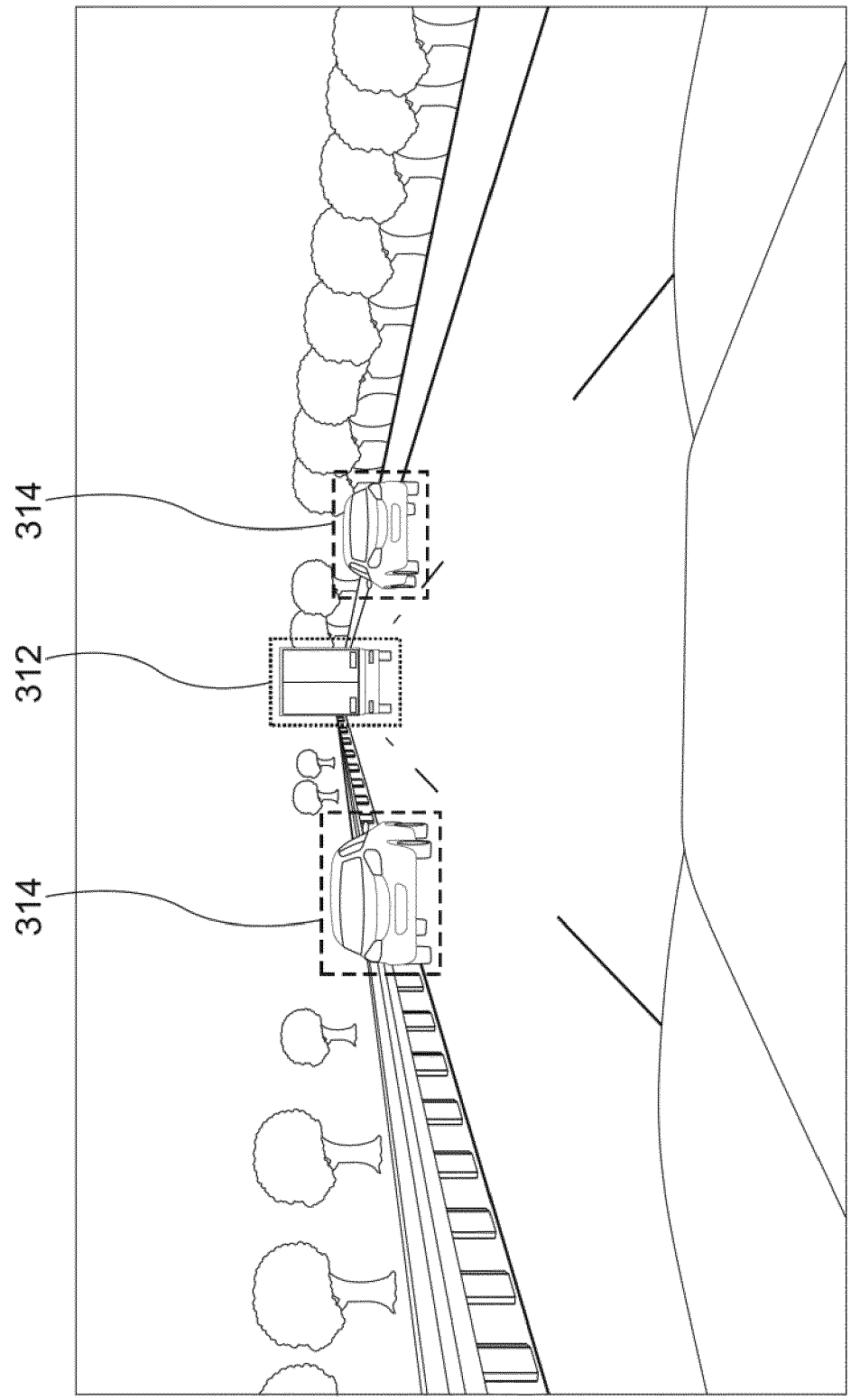
FIG. 3b shows a drawing of a sample image from fleet data.

FIG. 3b shows a drawing of a sample image from fleet data. Bounding box 312 highlights the vehicle which is doing a lane change, bounding boxes 314 show two further vehicles.

Lane change prediction, being a fundamental building block for any autonomous driving task, is a hot topic in research and has been investigated for several years. Picking the most informative features according to a criterion and then using "classical" methods, like SVMs or Random Forests may contribute to the core of research in lane change prediction. Schlechtriemen et al. ("A lane change detection approach using feature ranking with maximized predictive power," in Intelligent Vehicles Symposium (IV), 2014) analyzed the expressive power of a multitude of features and came to the conclusion that lateral distance to the lane's centerline, lateral velocity, and relative velocity to the preceding car are the most discriminative features. They introduced two models, a Naive Bayesian approach and a Hidden Markov Model on top of the Naive Bayesian model, with the vanilla Naive Bayesian approach performing better. In another work, Schlechtriemen et al. ("When will it change the lane? a probabilistic regression approach for rarely occurring events," in Intelligent Vehicles Symposium (IV), 2015) tackle the problem of predicting trajectories, where they consider lane change prediction as a helping subtask. To achieve better generalization, they fed all the available features to a random forest.

Woo et al. (Dynamic potential-model-based feature for lane change prediction," in Int. Conf. on Systems, Man, and Cybernetics (SMC), 2016) propose a hand-crafted energy field to model the surrounding of a car for prediction with a custom SVM model. Weidl et al. ("Situation awareness and early recognition of traffic maneuvers," in EUROSIM Congress on Modelling and Simulation, 2016) introduce Dynamic Bayesian Networks for maneuver prediction with input features from different sensors and safety distances to the surrounding vehicles.

A potential drawback of the above approaches is the improper handling of the temporal aspect of features. A simple concatenation of features across time may lose expressibility in the temporal domain, mainly due to a high degree of correlation in the features. Patel et al. ("Predicting future lane changes of other highway vehicles using rnn-based deep models," arXiv preprint arXiv:1801.04340, 2018) introduce a Structural Recurrent Neural Network for this problem. Three Long Short-Term Memory (LSTM) cells handle the driving and neighbouring lanes, with inputs being the features of the surrounding vehicles on the corresponding lanes as well as features of the target. Zeisler et al. ("Vision based lane change detection using true flow features," in Int. Conf. on Intelligent Transportation Systems (ITSC), 2017) follow a different scheme by using raw video data instead of high-level features. Using optical flow, lane changes of observed vehicles are predicted. General intention prediction is a close relative of maneuver prediction. Jain et al. ("Recurrent neural networks for driver activity anticipation via sensory-fusion architecture," in Int. Conf. on Robotics and Automation (ICRA), 2016) demonstrate results on predicting driver intentions.

Attention mechanisms may be used in vision and translation tasks. The key idea may be to guide the model towards certain points of the input, such as important image regions for visual tasks, and particularly relevant words in translation. At least some embodiments integrate a temporal attention mechanism into a model, which may cherry-pick relevant features across a sequence.

At least some embodiments relate to predicting lane change maneuvers of cars (e.g. the target vehicle) surrounding the ego car (e.g. the vehicle 100). In various embodiments and examples, the following notation may be used. $F_t$ may denote a snapshot of the scene at timestep t containing N vehicles. A prediction algorithm assigns a maneuver label {left: L, follow: F, right: R} to each of the N vehicles present in $F_t$. Predicting L or R may express the algorithm's belief that a vehicle has started a lane change maneuver to the respective side. Predicting F, conversely, may imply that a vehicle keeps its current lane. To obtain a prediction, in examples, the following features may be used for each of the N cars (considered as target vehicle) in $F_t$:

Target vehicle features (e.g. the group of features related to driving parameters of the target vehicle): $G^Z=(m, v_{lat}, v_{long}, a_{lat}, h)$. m: target's lateral distance to its lane's center line, $v_{lat}$: lateral velocity, $v_{long}$: longitudinal velocity, $a_{lat}$: lateral acceleration, and h: heading angle. These features may be computed in Frenet coordinates. The coordinate axis is along the target object's lane center line.

Dynamic environment features, i.e. features of cars surrounding the target (e.g. the group of features related to one or more further vehicles in a vicinity of the target vehicle):

$G^E=(dt_X$ for $X \in PV, RV, PLV_L, PLV_R, PFV_L, PFV_R)$, in accordance with the definition of Nie et al. ("Modeling of decision making behavior for discretionary lane-changing execution," in Int. Conf. on Intelligent Transportation Systems (ITSC), 2016) (see FIG. 3c). Here $dt_X$ denotes the temporal distance between the target and car X, i.e. the distance divided by the velocity of the trailing car.

Static environment features (e.g. the group of features related to a static environment of the target vehicle): Static features describe the environment type, e.g. map based features. In the NGSIM dataset an on-/off-ramp is present, which is integrated as $G^M=(d_{on}, d_{off}, \text{lane})$. $d_{on}, d_{off}$ denote the distance to the nearest on-/off-ramp respectively. lane is the one hot encoding of the lane identifier.

Figure 3C:
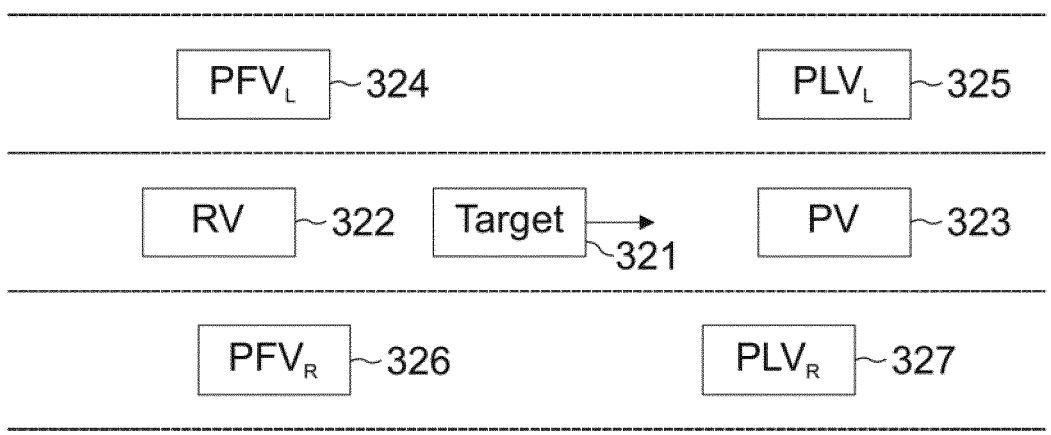
FIG. 3c shows a visualization of dynamic environment features.

FIG. 3c shows a visualization of the dynamic environment features, direction of travel is towards the right. FIG. 3c shows the target vehicle 321 moving towards the right, a vehicle RV 322 at the rear of the target vehicle, a vehicle PV 323 in front of the target vehicle, vehicles PFVL 324 following and PLVL 325 leading the target vehicle on the lane left of the center lane and vehicles PFVR 326 following and PLVR 327 leading the target vehicle on the lane right of the center lane.

At least some embodiments use two kinds of recurrent networks for maneuver prediction, (a) comprising or consisting of multiple LSTM cells, and (b) an attention layer on top of that network.

The models may be trained in a sequence-to-sequence fashion, i.e. at every timestep t an output $y_t \in \{L, F, R\}$ may be generated. The input features (T, E and M) used for the approaches are described in more detail later.

Figure 3D:
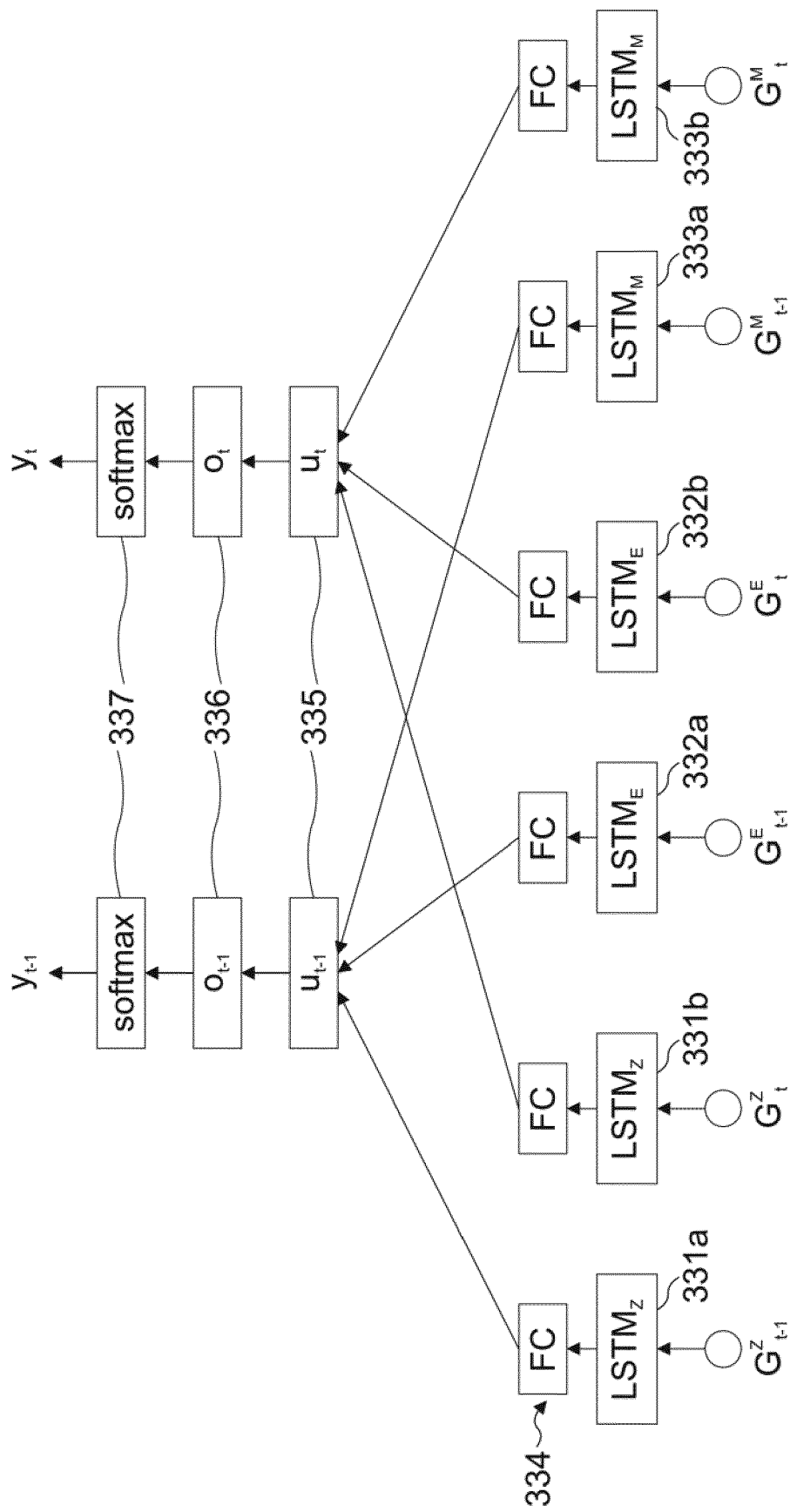
FIG. 3d shows a visualization of a Long Short Term Memory network.

At least some embodiments use a LSTM network with three different LSTM cells ($LSTM_Z$, $LSTM_E$, $LSTM_M$) (e.g. the machine-learning network) to process the feature groups ($G^Z$, $G^E$, $G^M$) respectively. This decoupling into separate LSTMs may provide that the intra-group correlation is high but the inter-group correlation is low. The following short hand notation may be used for an LSTM cell:

$$(h_t^X, \tilde{c}_t^X) = LSTM(X_t, h_{t-1}^X, \tilde{c}_{t-1}^X)$$

where $X \in \{G^Z, G^E E, G^M\}$ is the input, h denotes the hidden state and $\tilde{c}$ the memory unit. The full network can be seen in FIG. 3d. FIG. 3d shows a visualization of the used LSTM network. Each feature category is processed by a different LSTM cell ($LSTM_Z$ for t-1 331a, $LSTM_Z$ for t 331b, $LSTM_E$ for t-1 332a, $LSTM_E$ for t 332b, $LSTM_M$ for t-1 333a, $LSTM_M$ for t 333b). The LSTMs receive the respective inputs ($G_{t-1}^Z, G_t^Z, G_{t-1}^E, G_t^E, G_{t-1}^M, G_t^M$). The results are then fused through layers $u_{t-1}, u_t$ 335 and $o_{t-1}, o_t$ 336. The prediction output y (e.g. the information related to the lane change of the target vehicle) is obtained by applying a softmax function 337. FC 334 denotes a fully connected layer.

Mathematically the fusion of these 3 LSTMs can be formulated as equation (1):

$$u_t = W_F[\text{concat}(W_X h_t^X + b_X)] + b_F$$

$$o_t = \tanh(W_u \cdot u_t + b_u)$$

$$y^t = \text{softmax}(W_o \cdot o_t + b_o)$$

where W's are the weight matrices, b's are bias vectors, u is the fusion layer, and y is the output layer.

At least some embodiments may use an attention network (e.g. the attention mechanism). The idea behind an attention mechanism is to model selective focus, i.e. on certain parts of the input. It mainly comprises or consists of a function processing a key (K) and query (Q) to obtain a context vector, which is the accumulation of multiple keys, weighted by their importance with respect to the query. Embodiments may employ two kinds of attention mechanisms, (a) attention over previous time steps, i.e. self-attention, and (b) attention over different feature groups.

As opposed to some other attention approaches, the features embodiments use may lie in different spaces and have different modalities. They might not be accumulated, but their magnitude might (only) be changed in accordance to the weighting, and these feature vectors may be accumulated over the time steps, see FIG. 3e for an intuitive visualization.

Figure 3E:
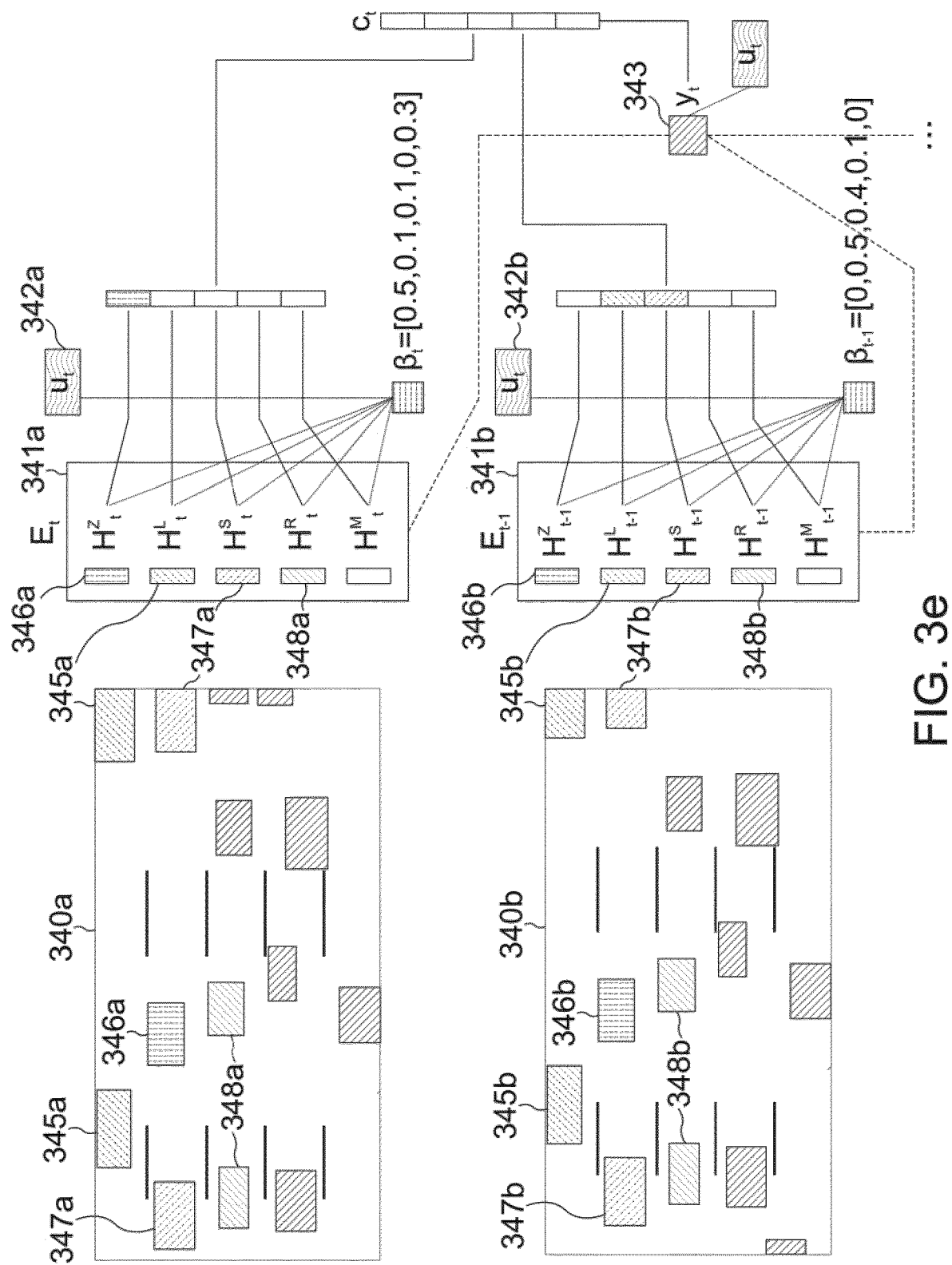
FIG. 3e shows an example of attention computation.

FIG. 3e shows an example of attention computation for a frame at time t: for this, the time steps t-N, . . . , t are considered. Scenes for times t 340a and t-1 340b are drawn in vertical order. The embeddings $E_t, E_{t-1}$ 341a, 341b are shown next to it. Using the layer $u_t$ 342a, 342b as key, the attention weights $\beta_t, \beta_{t-1}$ are calculated, with which the embeddings are then scaled category-wise. Again using $u_t$ as key (K), the attention weights Yt 343 (e.g. the two or more weighting factors) are calculated, showing the importance of the different time steps. The weighted sum of the scaled embeddings with respect to Yt makes up the context vector $c_t$ 344. The vehicles 345a/b, 346a/b, 347a/b and 348a/b translate to the respective embeddings.

In at least some embodiments, the features may be partitioned into categories, but with a finer granularity than in the previous section III, viz. $H^Z=G^Z$, $H^S=[dt_{PV}, dt_{RV}]$, $H^L=[dt_{PLV_L}, dt_{PFV_L}]$, $H^R[dt_{PLV_R}, dt_{PFV_R}]$ and $H^M=G_t^M$. The attention function $\Psi: \mathbb{R}^d \to \mathbb{R}$ is given by equation (2):

$$\Psi(W, v, Q, K) = v^T \tanh(W[Q;K])$$

For time step t in all calls of $\Psi$, layer $u_t$ serves as key. Let T={t-N, . . . , t} be the time steps used for self-attention. In some examples, N=20 is used. For each $i \in T$, the feature categories may be embedded into a higher dimensional space, and the importances of each feature category, $\beta_i^X$, as well as each time step as a whole, $\gamma_i$, may be determined. Let equation (3):

$$C = \{H^Z, H^L, H^S, H^R, H^M\}$$

$$E_i^X = W_X X_i + b_X$$

$$\beta_i^X = \Psi(W_x, v_x, u_t, E_i^X)$$

$$\gamma_i = \Psi(W_{Time}, v_{Time}, u_t, \text{concat}([E_i^X]))$$

$$\beta_i = \text{softmax}([\text{concat}(\beta_i^X)])$$

where $X \in C$, $i \in T$. Eventually, the feature categories are scaled with $\beta_i^X$ and the weighted sum is calculated over all time steps. The resulting context vector is appended to the fusion layer and the computation follows Eq. (1).

$$\gamma_t = \text{softmax}([\text{concat}(\gamma_i)])$$

$$c_t = \sum_{i \in T} \gamma_i \text{concat}([\beta_i X_i])$$

$$u_t = [u_t; c_t]$$

At least some embodiments may provide a visualization of Attention. Apart from improved performance, another large benefit of attention is its interpretability. In at least some approaches, merely the magnitude of the attention weights, which are used in the calculation of the weighted mean, is shown. Here though, due to the different scales and dimensions of the feature categories, this might not necessarily lead to expected results. Instead, in embodiments, the derivative of the predicted class may be calculated by the attention weights $\beta_i^X$ and $\gamma_t$, summing over all time steps. This derivative denotes the contribution of category X to the resulting prediction, even providing the information whether this contribution is positive or negative.

At least some embodiments may employ an exponentially growing loss to encourage early predictions. The used Softmax loss may be weighted with $\alpha \, w_t \, \exp(-T)$, where at time t a lane change is imminent in the next T seconds. Exponential weighting of the loss function might not be done for the fleet data, as the human labels are error free. $\alpha$ may be chosen such that the average value of $\alpha \cdot \exp(-T)$ over all frames of each lane change maneuver equals 1. For a given maneuver at time t, $w_t$ may be inversely proportional to that maneuver's global size in training data.

As noted by Schlechtriemen et al., simple scenarios cover a majority of lane changes, and a relatively good prediction can already be achieved by using a small subset of features from $G^Z$. To tackle this imbalance and induce a meaningful gradient flow for the attention in all cases, various embodiments introduce a dropout layer in between layer u and o, i.e.

$$\text{Dropout} = [W_{Drop,Fusion}; W_{Drop,c}] \cdot [u_t; c_t] + b_{drop}$$

With a probability p=0.33, $W_{Drop,Fusion}$ and $W_{Drop,c}$ may be set to 0 independently, forcing the model to rely solely on its recurrent architecture or attention.

Figure 3F:
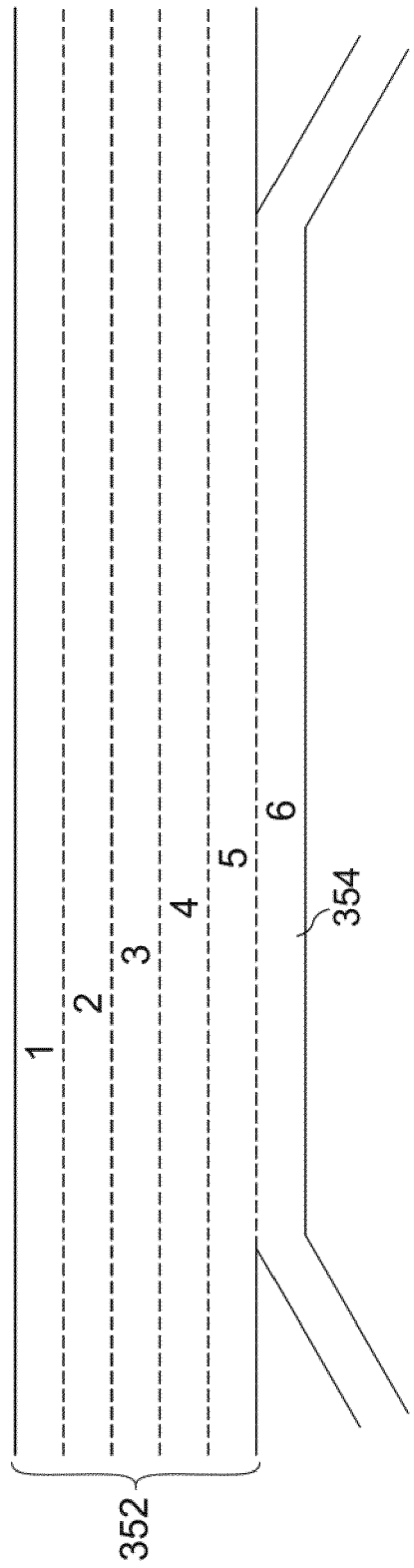
FIG. 3*f* shows a sketch of a dataset of a highway (US-101) with 5 lanes.

Embodiments have been evaluated using various datasets. The Next Generation Simulation (NGSIM) project consists of four publicly available traffic data sets. The US Highway 101 dataset (US-101) and Interstate 80 Freeway dataset (I-80), FIG. 3f, has been used. FIG. 3f shows a sketch of the US-101 dataset (proportions are not to the actual scale) with 5 lanes 352 and a lamp lane 354. Note that the I-80 dataset has no off-ramp. Data is captured from a bird's-eye view of the highway with a static camera, and vehicle related high level features are extracted from it. The datasets contain measurements at 10 Hz. After removing noisy trajectories, 3184 lane changes are observed. Another dataset stems from fleet data: The fleet data comes from the environmental model of series cars. This data is captured at 25 Hz with respect to a moving ego car equipped with several camera and radar sensors to give a complete 360° view. 830 lane changes are recorded.

A wide variety of metrics is used to measure the performance of lane change prediction algorithms. Predominantly they are inspired from information retrieval and are computed treating each timestep independently of the other.

Accuracy: percentage of timesteps correctly classified. Jain et al. introduced a first version of the following maneuver-based metrics:

Precision: percentage of true predictions w.r.t total number of maneuver predictions.

Recall: percentage of true predictions w.r.t total number of maneuvers.

Time to Maneuver (TTM): the interval between the time of prediction and the actual start of the maneuver in the ground truth.

The ground truth labels are event-wise continuous (see FIG. 3g). Maneuver labels are continuous events. In FIG. 3g, 'F' denotes follow from t=[0, t1] and t=[t2, T], and 'LC' denotes a lane change event from t=[t1, t2].

The information retrieval metrics, however, might not reflect this event-wise nature or what the driver experiences in the car. The car's controller may react to the first prediction event (see FIG. 3h). If the prediction is discontinuous then this causes discomfort to the driver (stop-and-go function). Besides, the prediction event may be as early as possible with respect to the ground truth, the earlier the prediction the higher is the comfort. In order to reflect such comfort related behavior, embodiments may use the following event-wise metrics:

Delay: delay (measured in seconds) in prediction with respect to the ground truth label. If prediction is perfectly aligned with the ground truth then delay is 0.

Overlap: for a given ground truth event the percentage of overlap for the earliest maneuver predicted. Higher the overlap, smoother is the controller's reaction.

Frequency: number of times a maneuver event is predicted per ground truth event. For the 'follow' event this indicates the false positive rate (FPR).

Miss: number of lane changes completely missed. The higher the number of misses, the higher is the discomfort, as the driver has to intervene.

In FIG. 3h, if a given ground truth event 372 has multiple corresponding prediction events then, for overlap LC1 374 and LC2 376 in spiky prediction 378. The comfort related metrics for the event of FIG. 3h is delay=0, overlap=20%, frequency=2, miss=0.

The perception of the precise moment when a lane change starts differs from person to person, see FIG. 3i. In FIG. 3i, human vs human labels are compared: Precision Recall of ground truth lane changes on proprietary fleet data. Each trace was labeled by 3 different humans. Metrics were computed in a "1 vs rest fashion" then averaged. This shows that humans agree on almost all lane changes, but there is a slight disagreement on when the maneuver actually starts i.e. notion of intention of maneuver varies across humans.

Therefore, manually labeling lane changes in fleet data may give a hint at the intention. However, automatic labeling may be useful in the case of NGSIM due to a similar time span of lane changes. Thus, a 3 second criterion may be used, before the target's lane assignment changes, to label a lane change. Though human labeling is precise and error free, it may be time consuming and expensive. Intelligent automatic labeling can be slightly imprecise, but on the contrary, may be quicker and might prove to be better for deep models, which could pick up on fine cues imperceptible to humans to achieve a better performance.

Embodiments were evaluated. The two proposed recurrent methods are denoted LSTM-E (extended LSTM) and LSTM-A (extended LSTM with attention). For both, a hidden size of 128 is used. State-of-the-art baselines were used to demonstrate better performance of embodiments.

A. Baseline Methods

Frame based: Features from a single timestep are used.
Random Forest (RF): The concatenated features ($G^Z$, $G^E$, $G^M$) serve as input.
Naive Bayes (NB): The features m, $v_{lat}$ and relative velocity to preceding car are used.

Sequence based:
Structural RNN (SRNN): The SRNN comprises three different LSTM cells which cover the target, left, and right lane respectively. To each LSTM cell, the features Q of three vehicles are given, viz. those of the two neighbors of the target car (PV-RV/PLV$_L$-PLV$_R$/PLV$_R$-PFV$_R$) and the target car itself. Q may consist of absolute world coordinates, lateral and longitudinal velocity, heading angle, and number of lanes to the left and right. The output of the three LSTM cells is passed on to another LSTM cell, which eventually outputs the prediction.

Vanilla LSTM (LSTM): Vanilla LSTM consisting of a single cell with the concatenated features (GZ, GE, GM).

FIG. 4 shows the results of all tested methods with respect to all metrics on the NGSIM and fleet dataset. FIG. 4 shows a comparison and ranking of different methods on different metrics for NGSIM (top table) and fleet data (bottom table). Global rank may be the average of an algorithm's rank per column, the lower, the better. The rank of an algorithm for a particular column is the index it occupies after sorting that column.

As it can be seen, due to the diversity of the evaluation metrics, some methods excel or fail in different categories. Sequence-based methods may outperform frame-based methods since the latter carry no information regarding the sequence history. Among sequence-based methods, the three recurrent models, LSTM, LSTM-E, and LSTM-A of embodiments, come out on top (refer the 'Rank' column in the table).

On the NGSIM dataset, the LSTM network with attention is the best performing method. It has the lowest delay while predicting lane changes, a lower false positive rate during 'follow', and a good continuous prediction indicated by 'overlap'. On the fleet data LSTM-A finished second. A plausible reason for this is the simplistic structure of the dataset, as the scenes tend to be less crowded, and thus do not utilize the full power of a complex attention mechanism.

As it can be seen from FIG. 4, the performance of some methods is relatively similar. Analyzing and interpreting a few critical corner cases will help in assessing the performance. This may provide clarity about the advantage of an attention mechanism. These critical corner cases are not present in the data. They were created by translating around the existing trajectories with respect to their position in the scene, and thus remain realistic. For the fleet data no static data recording was available, but instead a moving ego car (e.g. 616 of FIG. 6a) from which the measurements of the scene are obtained. Two types of visualizations are used, (a) a snapshot visualization of a single frame, and a visualization of the temporal development of a scene. The first may comprise a single image, showing the ground truth and prediction of a single algorithm for that frame, as well as the attention visualization for the five feature categories. For better readability the categories HZ, HS, HL, HR and HM are denoted by Target, Same, Left, Right, and Map/Street. (b) concatenation of several frames spanning a certain amount of time, along with the prediction of different algorithms.

FIGS. 5a to 5e show the influence of attention to the network's decision making, highlighting its correct and intuitive contribution.

Figure 5A:
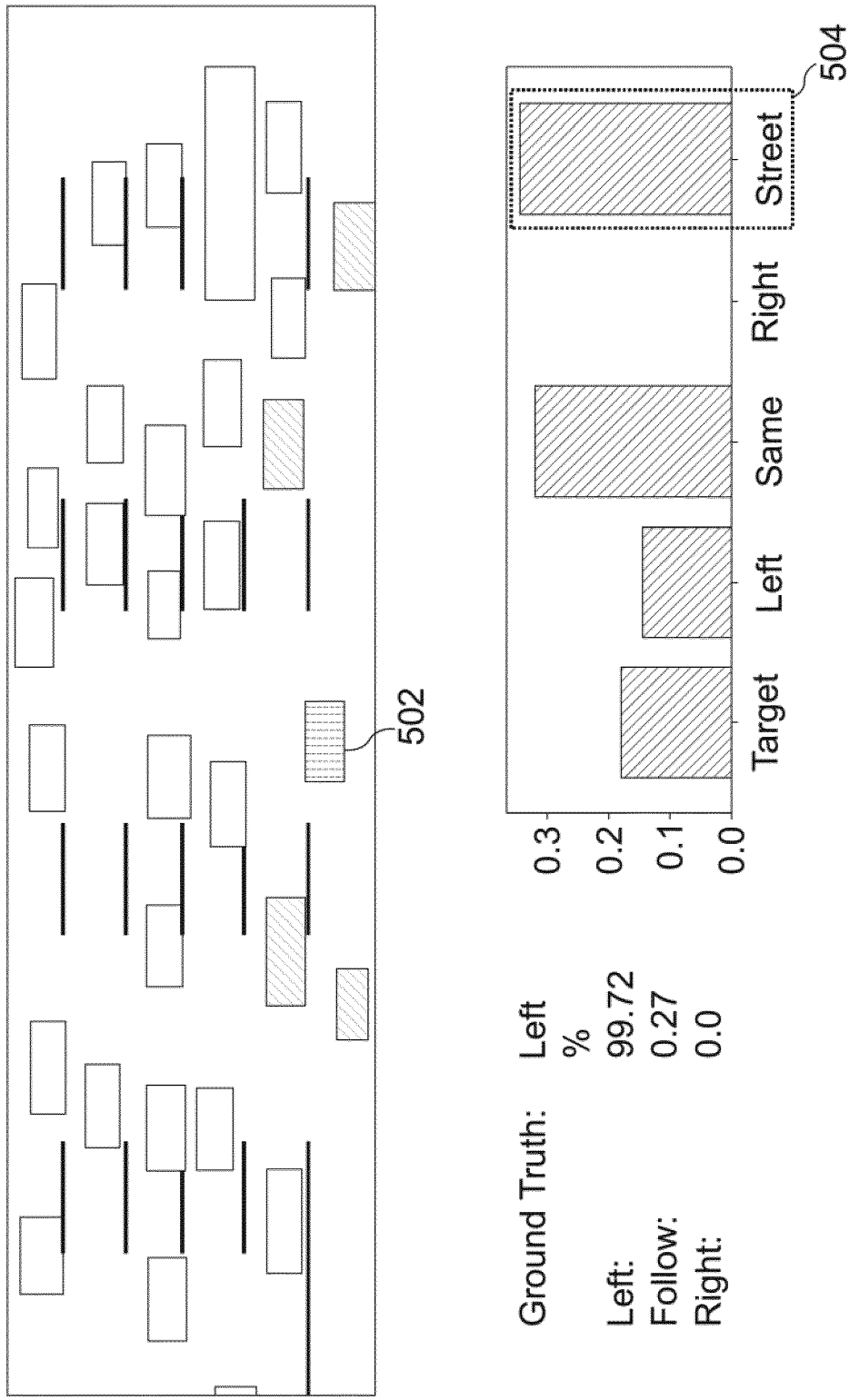
FIGS. 5*a* to 5*e* show the influence of attention to the network's decision making, highlighting its correct and intuitive contribution.
Figure 5B:
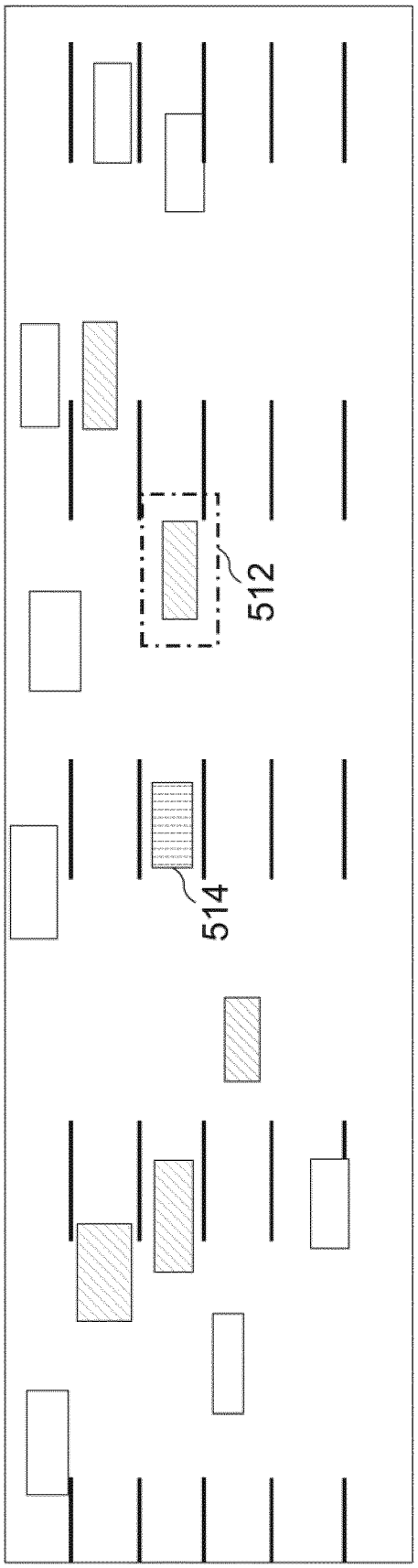
Figure 5B:
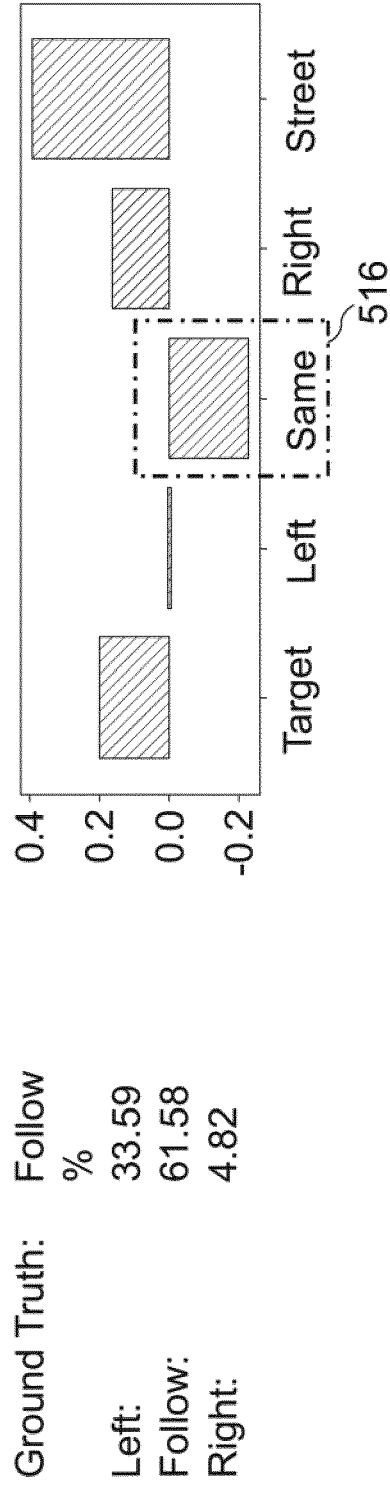
Figure 5C:
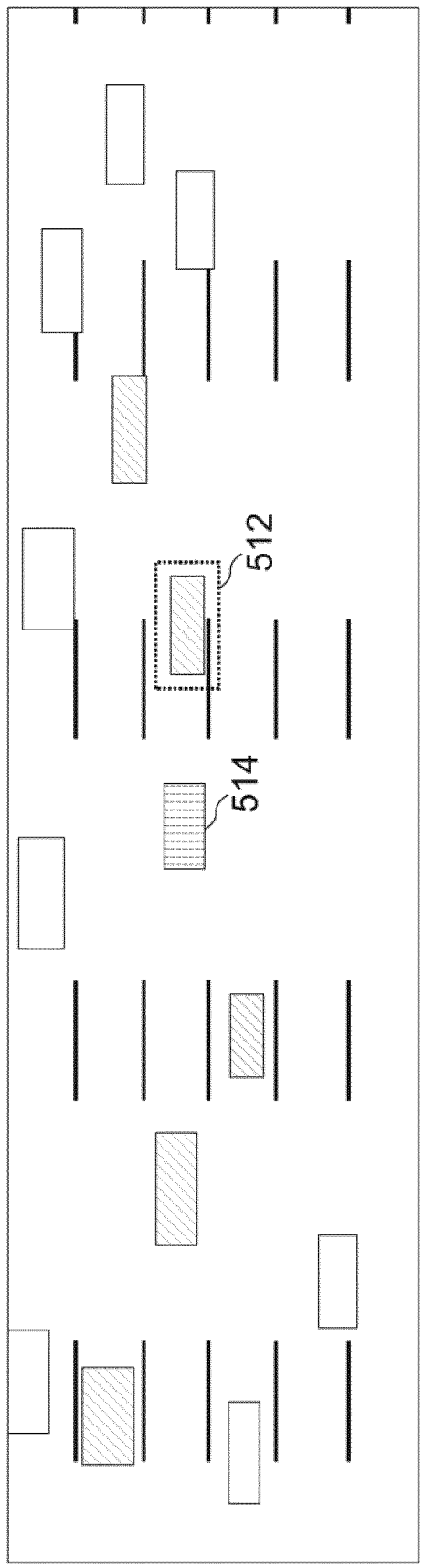
Figure 5C:
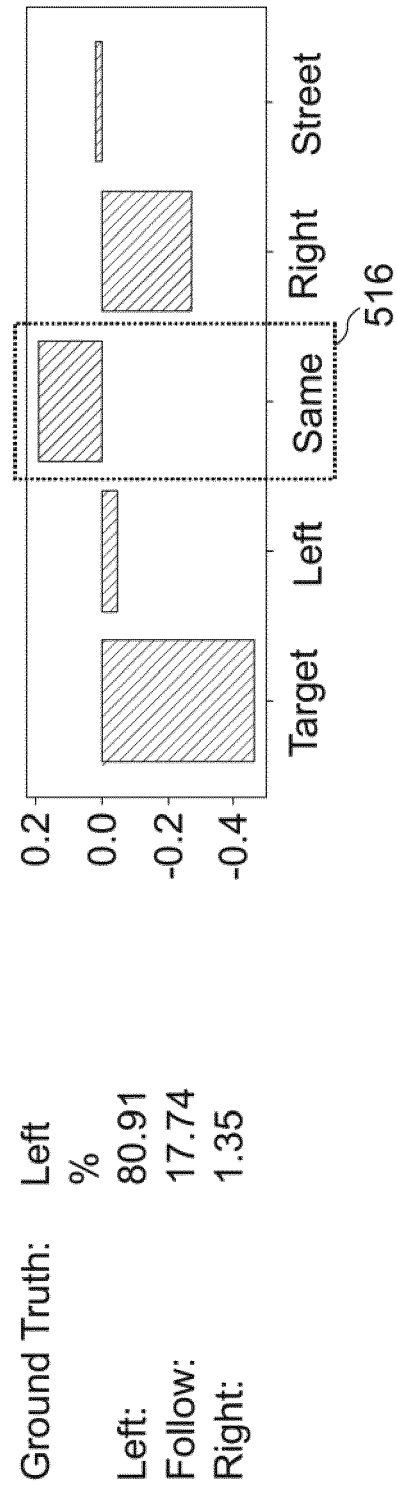
Figure 5D:
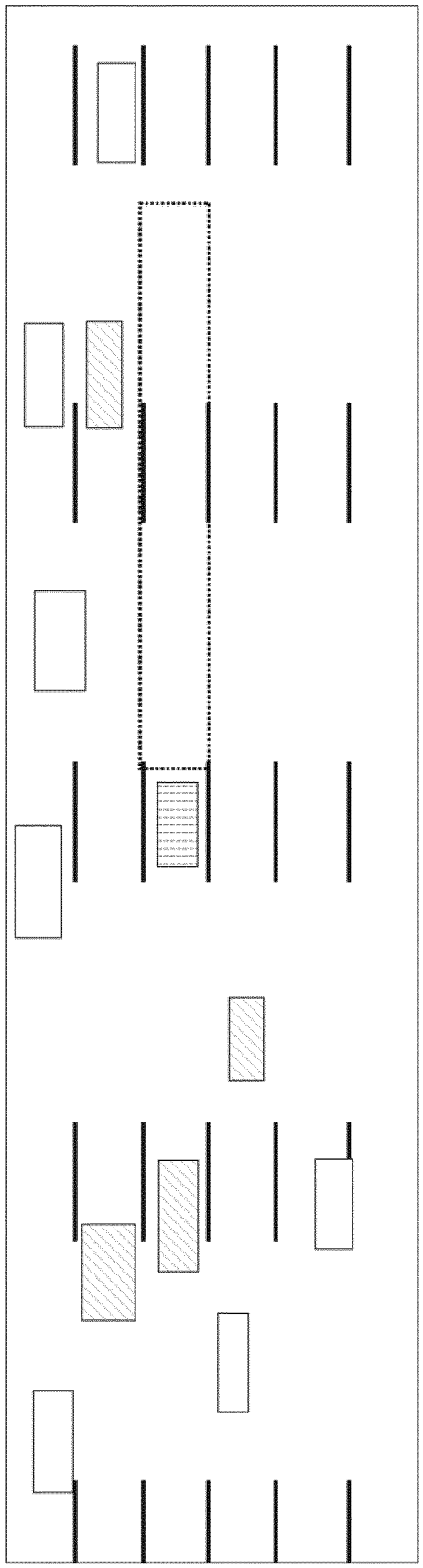
Figure 5D:
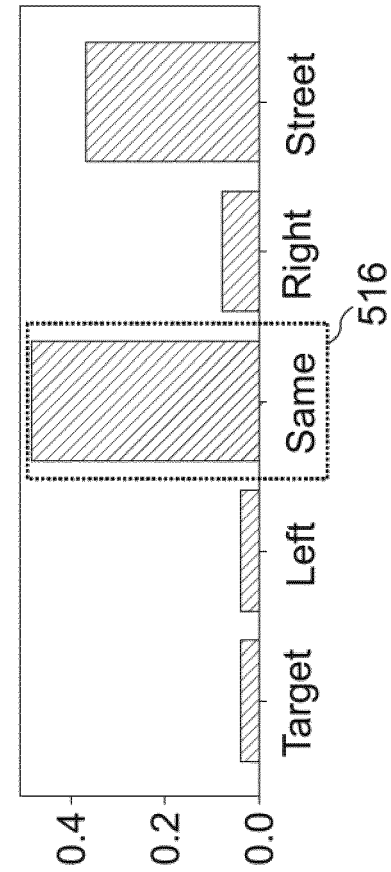
Figure 5E:
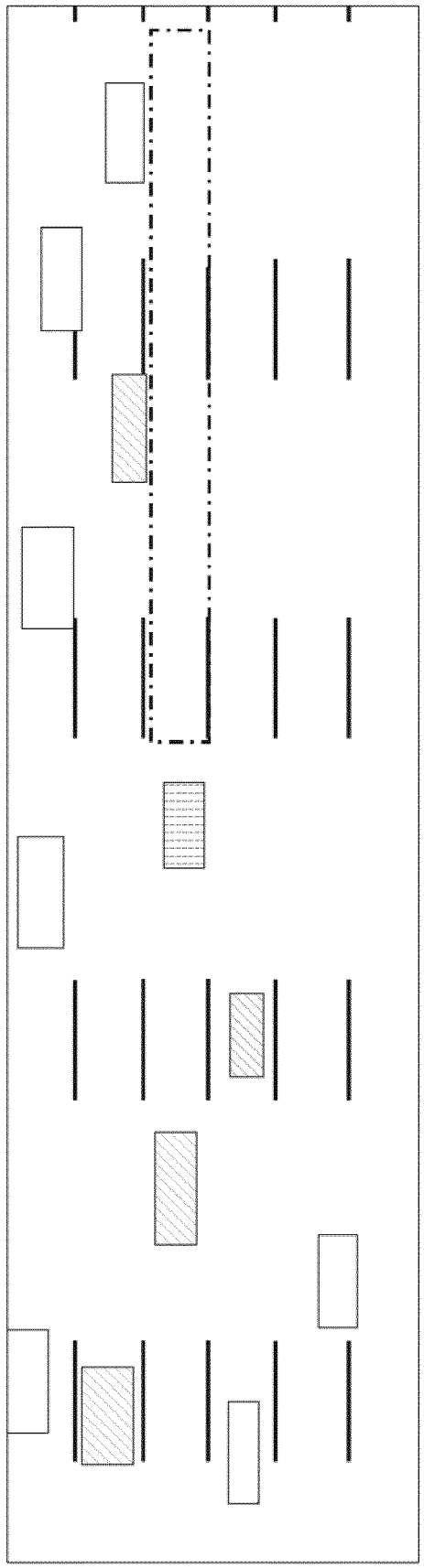
Figure 5E:
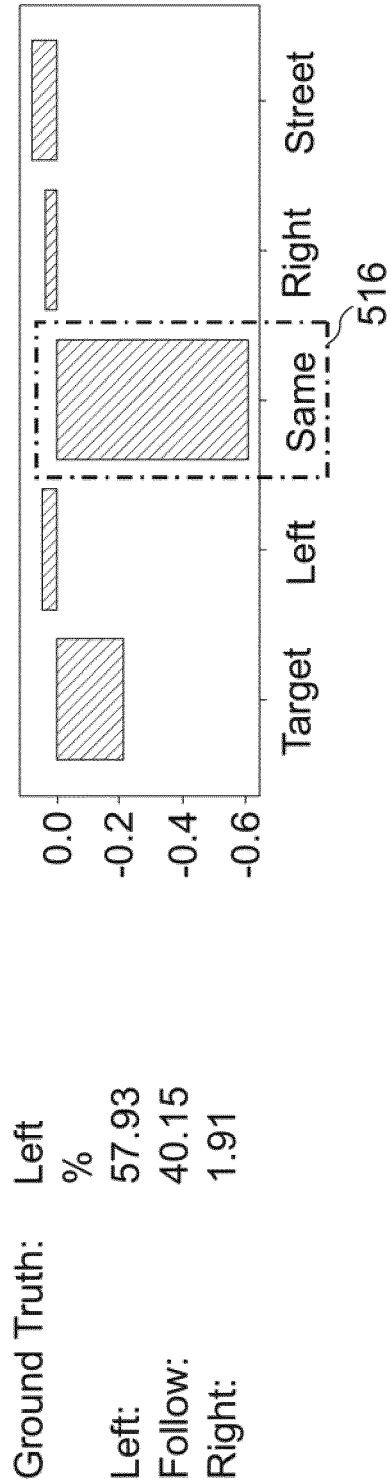

In FIG. 5e, the target car/vehicle 502 is executing a lane change to the left from the auxiliary lane. As changing lanes after an on-ramp is the usual and expected behavior, Street 504 has a high positive contribution for predicting L.

In FIGS. 5b to 5e, two scenes of a lane change to the left are shown. Scene (a) of FIGS. 5b and 5c and (b) of FIGS. 5d and 5e stem from the same real scene and differ only in the placement of PV 512, which is close to the target in (a) and missing in (b). In the first figures (FIG. 5b, FIG. 5d), respectively, F is predicted, in the second (FIG. 5c, FIG. 5e) L.

In FIG. 5b/5c, the target (514) rapidly approaches PV 512, and humans can anticipate a forthcoming lane change. The same reasoning is done by the attention mechanism, Same 516 has a strong negative contribution to the prediction F, and positive contribution to the eventual prediction of L. In FIGS. 5d/5e, the contribution of Same is correctly reversed with respect to a.

Figures 2, 6A:
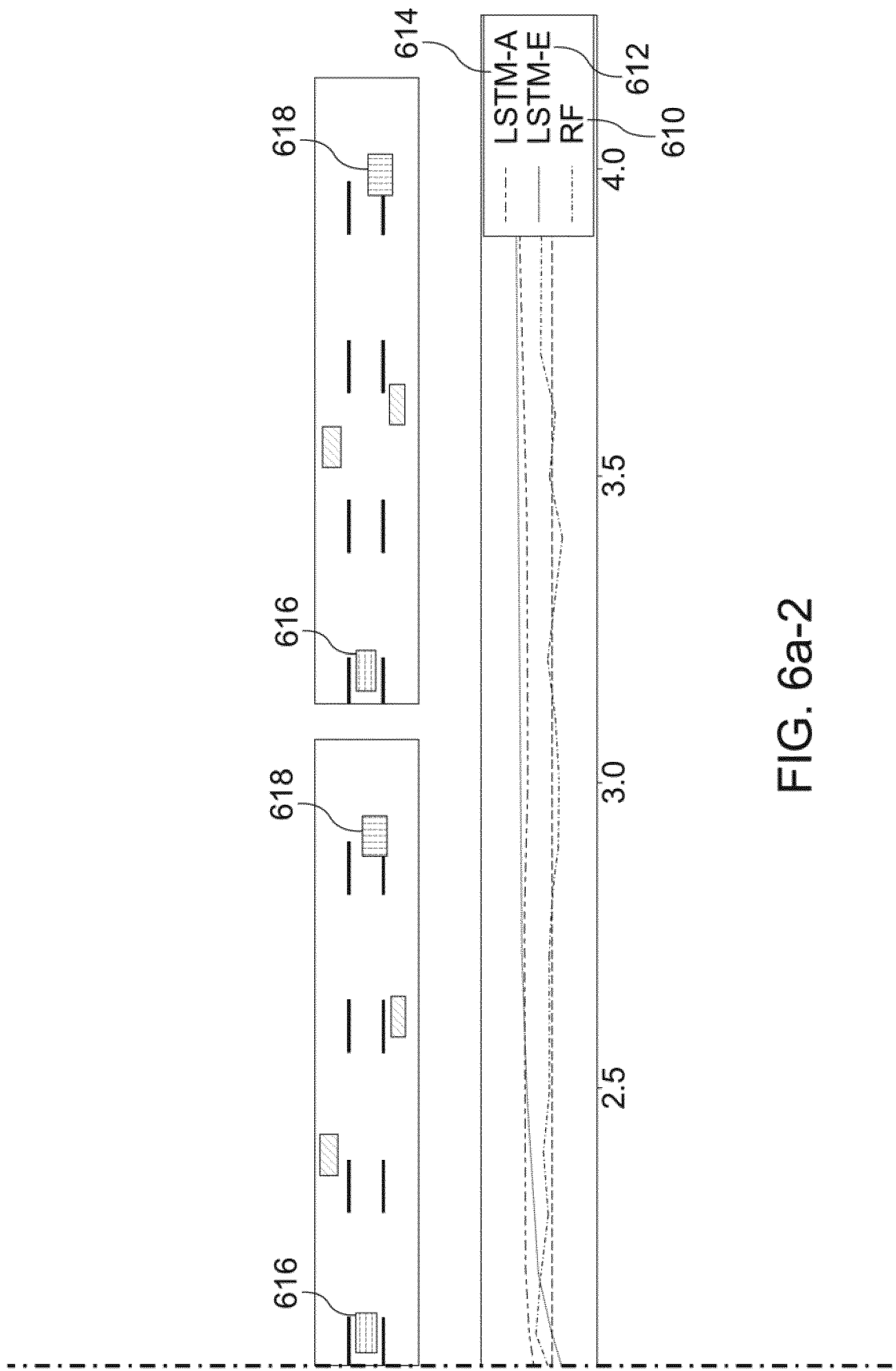
FIG. 6*a* shows a visualization of a lane change to the right as recorded from a series car.
Figures 2, 6B:
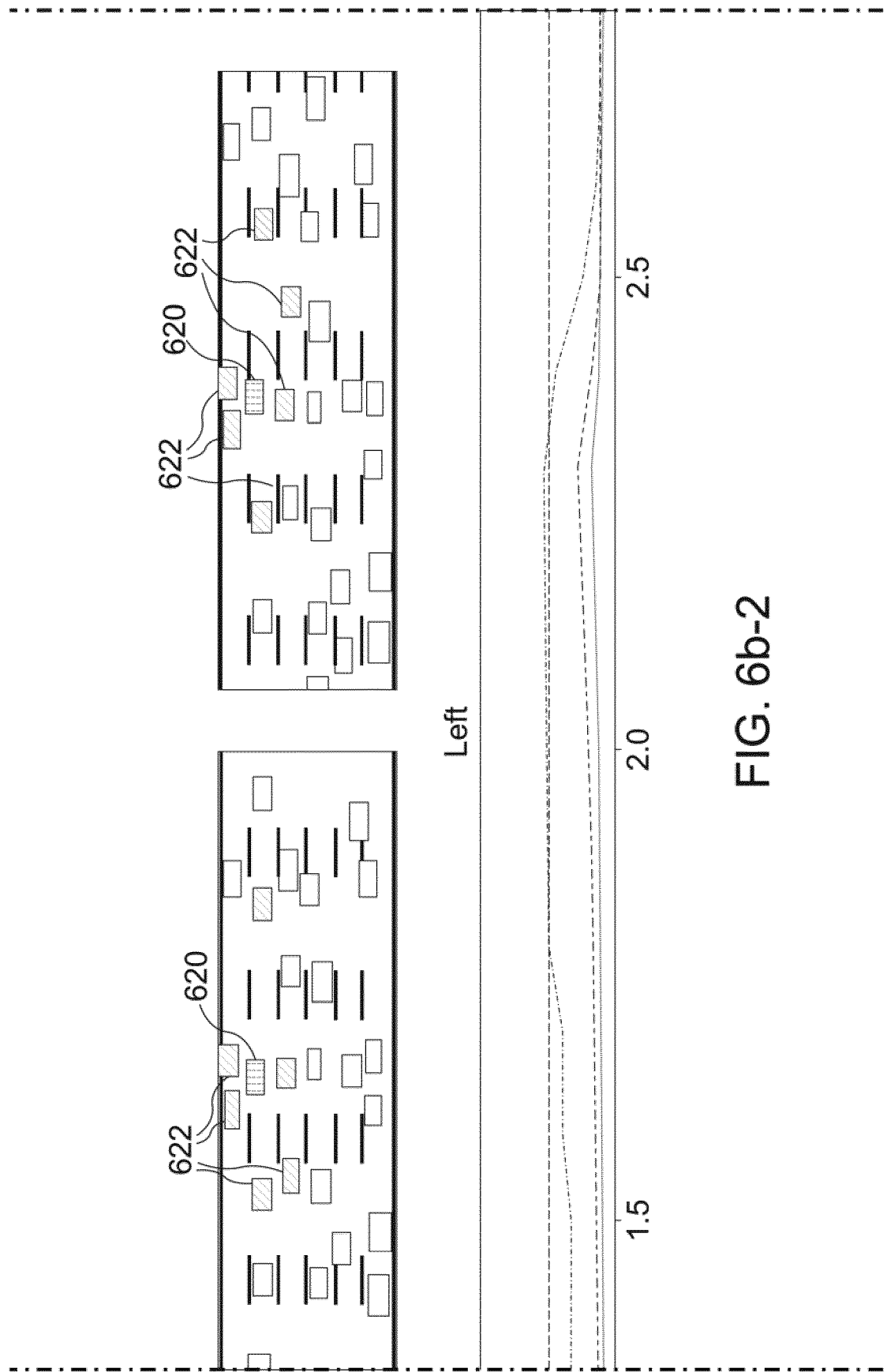
FIG. 6*b* shows a visualization of a "fake" lane change to the left.
Figures 3, 6B:
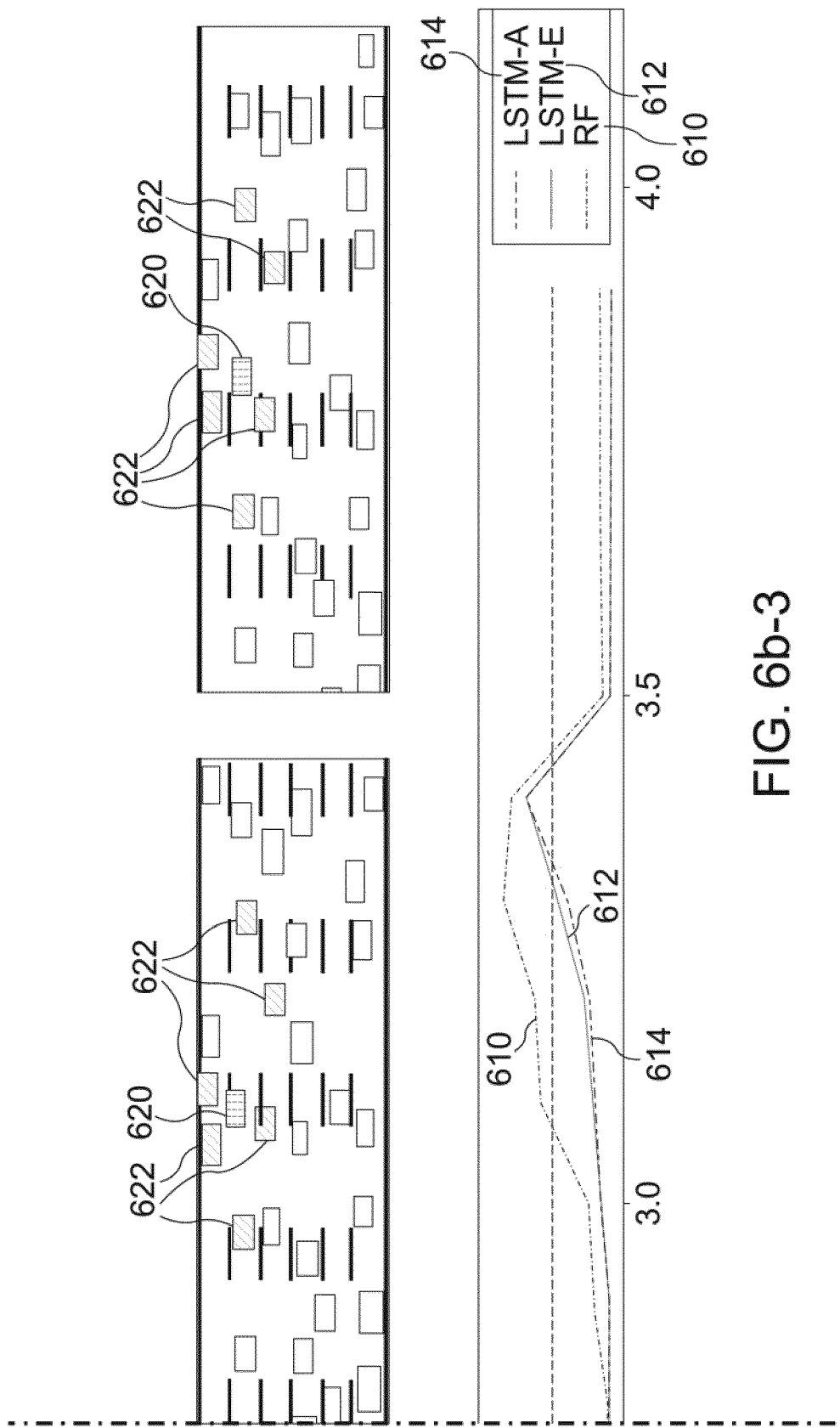

FIGS. 6a and 6b show the temporal development of two scenes while plotting the output of three algorithms—RF 610, LSTM-E 612, and LSTM-A 614. Overall a superior performance of the recurrent models, especially LSTM-A, can be observed.

FIG. 6a shows a visualization of a lane change to the right as recorded from a series car (FIG. 3b shows the front-camera image). LSTM-A 614 predicts first, followed by Random Forest 610, and LSTM-E 612. The ego car is shown in the depicted scenes by reference signs 616, the car performing the lane change is shown by reference signs 618.

FIG. 6b shows a "fake" lane change to the left. The target car (620) starts moving towards its left lane boundary. The lane change is impossible because it is blocked by neighboring cars (622). Despite this, Random Forest is "fooled" quickly and predicts a 'left' lane change, whereas the recurrent networks correctly predict 'follow' and has a false prediction only towards the end. Note that also an attention mechanism might not fully prevent a false lane change behavior, as the relation to surrounding cars is learned and not hard-coded. Once a strong lateral movement is observed, the possibility of a coming lane change may be considered, independent of the current road situation. Though in most of such cases, an attention mechanism can prevent a false lane change prediction.

Embodiments provide an LSTM network with an attention mechanism for lane change prediction, which may perform better than existing methods with respect to different evaluations schemes. The attention mechanism may tackle both prediction quality and understandability. At least some embodiments may provide new event-wise metrics catering to driver's comfort. Results on a public dataset as well as fleet data indicate a high level of comfort, in terms of earliness in prediction, false positive and miss rate, with methods of embodiments for the driver. Moreover, with visual analysis of critical cases, the effectiveness of using attention is demonstrated.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for determining a vehicle comfort metric of an ego vehicle for a prediction of a driving maneuver of a target vehicle, the method comprising:
    obtaining a start time of the driving maneuver of the target vehicle disposed within the surroundings of the ego vehicle;
    inputting a plurality of groups of input features of the target vehicle to a corresponding plurality of long short term memory (LSTM) cells of a recurrent neural network, wherein the groups of input features correspond to two or more of:
        driving parameters of the target vehicle,
        other vehicles in a vicinity of the target vehicle, or
        a static environment of the target vehicle;
    selectively applying a weighting to the groups of input features using an attention layer of the recurrent neural network;
    obtaining, as output from the recurrent neural network, a predicted start time of the predicted driving maneuver of the target vehicle; and
    determining the vehicle comfort metric of the ego vehicle for the prediction of the driving maneuver by comparing the start time of the driving maneuver and the predicted start time of the driving maneuver output from the recurrent neural network to determine a delay between the start time of the driving maneuver and the predicted start time of the driving maneuver, wherein a greater delay correlates to reduced vehicle comfort.

2. The method of claim 1, further comprising:
    obtaining a first duration of the driving maneuver of the target vehicle, wherein
        the vehicle comfort metric is further determined based on an overlap between the first duration of the driving maneuver and a second duration of the prediction of the driving maneuver.

3. The method of claim 1, wherein
    the vehicle comfort metric is further determined based on a number of discontinuous predictions made within a duration of the driving maneuver.

4. The method of claim 1, wherein
    the vehicle comfort metric is further determined based on a missed prediction of the driving maneuver.

5. A computer product comprising a non-transitory computer readable medium having stored thereon a program that, when executed on a computer, a processor, or a programmable hardware component, carries out the acts of:
    obtaining a duration of a driving maneuver of a target vehicle;
    inputting a plurality of groups of input features of the target vehicle to a corresponding plurality of long short term memory (LSTM) cells of a recurrent neural network, wherein the groups of input features correspond to two or more of:
        driving parameters of the target vehicle,
        other vehicles in a vicinity of the target vehicle, or
        a static environment of the target vehicle;

selectively applying a weighting to the groups of input features using an attention layer of the recurrent neural network;

obtaining, as output from the recurrent neural network, a prediction of the driving maneuver of the target vehicle; and determining a vehicle comfort metric for the prediction of the driving maneuver output from the recurrent neural network based on a quantity of discontinuous predictions made within the duration of the driving maneuver, wherein a greater quantity of discontinuous predictions correlates to reduced vehicle comfort.

6. The computer product of claim 5, wherein
the vehicle comfort metric is further determined based on a delay between a start time of the driving maneuver and a predicted start time of the driving maneuver.

7. The computer product of claim 5, wherein
the duration of the driving maneuver is a first duration, and
the vehicle comfort metric is further determined based on an overlap between the first duration of the driving maneuver and a second duration of the prediction of the driving maneuver.

8. The computer product of claim 5, wherein
the vehicle comfort metric is further determined based on a missed prediction of the driving maneuver.

9. An apparatus for determining a vehicle comfort metric of an ego vehicle for a prediction of a driving maneuver of a target vehicle, the apparatus comprising:

at least one interface configured to:
obtain an extent of the driving maneuver of the target vehicle disposed within the surroundings of the ego vehicle;
the extent corresponds to one or more of:
a first duration of the driving maneuver of the target vehicle, or
a start time of the driving maneuver of the target vehicle;
input a plurality of groups of input features of the target vehicle to a corresponding plurality of long short term memory (LSTM) cells of a recurrent neural network, wherein the groups of input features correspond to two or more of:
driving parameters of the target vehicle,
other vehicles in a vicinity of the target vehicle, or
a static environment of the target vehicle;
selectively apply a weighting to the groups of input features using an attention layer of the recurrent neural network;
obtain, as output from the recurrent neural network, the prediction of the driving maneuver of the target vehicle; and a computation module configured to:
determine the vehicle comfort metric of the ego vehicle for the prediction of the driving maneuver output from the recurrent neural network based on an overlap between the first duration of the driving maneuver and a second duration of the prediction of the driving maneuver, wherein
a greater overlap correlates to increased vehicle comfort.

10. The apparatus of claim 9, wherein
the vehicle comfort metric is further determined based on a delay between the start time of the driving maneuver and a predicted start time of the driving maneuver.

11. The apparatus of claim 9, wherein
the vehicle comfort metric is further determined based on a number of discontinuous predictions made within the first duration of the driving maneuver.

* * * * *